US012665646B2

(12) United States Patent
Vitthaladevuni et al.

(10) Patent No.: US 12,665,646 B2
(45) Date of Patent: Jun. 23, 2026

(54) CONFIGURATIONS FOR CHANNEL STATE FEEDBACK

(71) Applicant: QUALCOMM Incorporated, San Diego, CA (US)

(72) Inventors: Pavan Kumar Vitthaladevuni, San Diego, CA (US); Hwan Joon Kwon, San Diego, CA (US); Taesang Yoo, San Diego, CA (US); Alexandros Manolakos, Escondido, CA (US); Naga Bhushan, San Diego, CA (US); June Namgoong, San Diego, CA (US); Jay Kumar Sundararajan, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 659 days.

(21) Appl. No.: 18/004,611

(22) PCT Filed: Aug. 13, 2021

(86) PCT No.: PCT/US2021/071188
§ 371 (c)(1),
(2) Date: Jan. 6, 2023

(87) PCT Pub. No.: WO2022/040665
PCT Pub. Date: Feb. 24, 2022

(65) Prior Publication Data
US 2023/0246693 A1       Aug. 3, 2023

(30) Foreign Application Priority Data

Aug. 18, 2020    (GR) ............................... 20200100488

(51) Int. Cl.
*H04B 7/06*          (2006.01)
*H04L 1/00*          (2006.01)

(52) U.S. Cl.
CPC ......... *H04B 7/0641* (2013.01); *H04B 7/0626* (2013.01); *H04L 1/0026* (2013.01); *H04L 1/0029* (2013.01)

(58) Field of Classification Search
CPC ... H04B 7/0641; H04B 7/0626; H04L 1/0026; H04L 1/0029
(Continued)

(56) References Cited

U.S. PATENT DOCUMENTS

| | | |
|---|---|---|
| 12,052,031 B2 | 7/2024 | Xu et al. |
| 2012/0002556 A1 | 1/2012 | Kishiyama et al. |

(Continued)

FOREIGN PATENT DOCUMENTS

WO          2018208792          11/2018

OTHER PUBLICATIONS

International Search Report and Written Opinion—PCT/US2021/071188—ISA/EPO—Nov. 26, 2021.
(Continued)

*Primary Examiner* — Candal Elpenord
(74) *Attorney, Agent, or Firm* — Harrity & Harrity, LLP

(57)          ABSTRACT

Various aspects of the present disclosure generally relate to wireless communication. In some aspects, a first device may receive a channel state information (CSI) feedback configuration comprising an indication to save, for a specified time period, a channel state feedback (CSF) that corresponds to a first reference signal carried on a downlink channel. The first device may transmit a differential CSF based at least in part on the CSF and a second reference signal carried on the downlink channel. Numerous other aspects are provided.

30 Claims, 21 Drawing Sheets

(58) Field of Classification Search
USPC ......................................................... 370/252
See application file for complete search history.

(56)                          References Cited

U.S. PATENT DOCUMENTS

| 2018/0367192 | A1 * | 12/2018 | O'Shea .................. G06N 3/044 |
|---|---|---|---|
| 2020/0228232 | A1 * | 7/2020 | Lyashev ................ G06T 7/0012 |
| 2020/0228297 | A1 | 7/2020 | Zhang et al. |
| 2020/0366326 | A1 * | 11/2020 | Jassal ........................ G06N 3/08 |
| 2021/0351885 | A1 * | 11/2021 | Chavva .................... G06N 3/08 |
| 2022/0360308 | A1 * | 11/2022 | Rahman ................. H04B 7/063 |
| 2023/0040739 | A1 * | 2/2023 | Song .................... H04B 7/0456 |
| 2023/0118031 | A1 * | 4/2023 | Cai ...................... H04B 7/0417 |
| | | | 706/25 |
| 2023/0155702 | A1 * | 5/2023 | Wang ................. H04L 25/0202 |
| | | | 370/252 |
| 2023/0246695 | A1 * | 8/2023 | Wang ................... H04B 7/0626 |
| | | | 375/267 |

OTHER PUBLICATIONS

Wang T., et al., "Deep Learning-Based CSI Feedback Approach for Time-Varying Massive MIMO Channels", IEEE Wireless Communications Letters, IEEE, Piscataway, NJ, USA, vol. 8, No. 2, Apr. 1, 2019 (Apr. 1, 2019), pp. 416-419, XP011719190, ISSN: 2162-2337, DOI: 10.1109/LWC.2018.2874264, [retrieved on Apr. 8, 2019], Sections I-III, Section IV, 1st-2nd Paragraph, p. 416-p. 418, Figure 1.

* cited by examiner

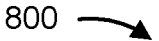

800

```
      ●                                        ●
      │                                        ▲
      ▼                                        │
┌──────────────────────┐            ┌──────────────────────┐
│ Convolution 64xW (1) │            │ Convolution 64xW (1) │
└──────────────────────┘            └──────────────────────┘
      │                                        ▲
      ▼                                        │
┌──────────────────────┐            ┌──────────────────────┐
│ Convolution WxW (1)  │            │ Convolution WxW (1)  │
└──────────────────────┘            └──────────────────────┘
      │                                        ▲
      ▼                                        │
┌──────────────────────┐            ┌──────────────────────┐
│ Convolution WxW (3)  │            │ Convolution WxW (3)  │
└──────────────────────┘            └──────────────────────┘
      │                                        ▲
      ▼                                        │
┌──────────────────────┐            ┌──────────────────────┐
│ Convolution WxW (3)  │            │ Convolution WxW (3)  │
└──────────────────────┘            └──────────────────────┘
      │                                        ▲
      │                                        │
      │                             ┌──────────────────────┐
      │                             │     ResNet (W)       │
      │                             └──────────────────────┘
      │                                        ▲
      │                                        │
      │                             ┌──────────────────────┐
      │                             │     ResNet (W)       │
      │                             └──────────────────────┘
      │                                        ▲
      ▼                                        │
┌──────────────────────┐            ┌──────────────────────┐
│       Flatten        │            │      Reshape         │
└──────────────────────┘            └──────────────────────┘
      │                                        ▲
      ▼                                        │
┌──────────────────────┐            ┌──────────────────────┐
│ Fully Connected      │            │ Fully Connected      │
│      4096xM          │            │      Mx4096          │
└──────────────────────┘            └──────────────────────┘
      │                                        ▲
      │          ┌──────────────────┐          │
      └─────────▶│  Quantization    │──────────┘
                 └──────────────────┘
```

FIG. 8

1010 Receive a channel state information (CSI) feedback configuration comprising an indication to save, for a specified time period, a channel state feedback (CSF) that corresponds to a first reference signal carried on a downlink channel 1020 Transmit a differential CSF based at least in part on the CSF and a second reference signal carried on the downlink channel

1000

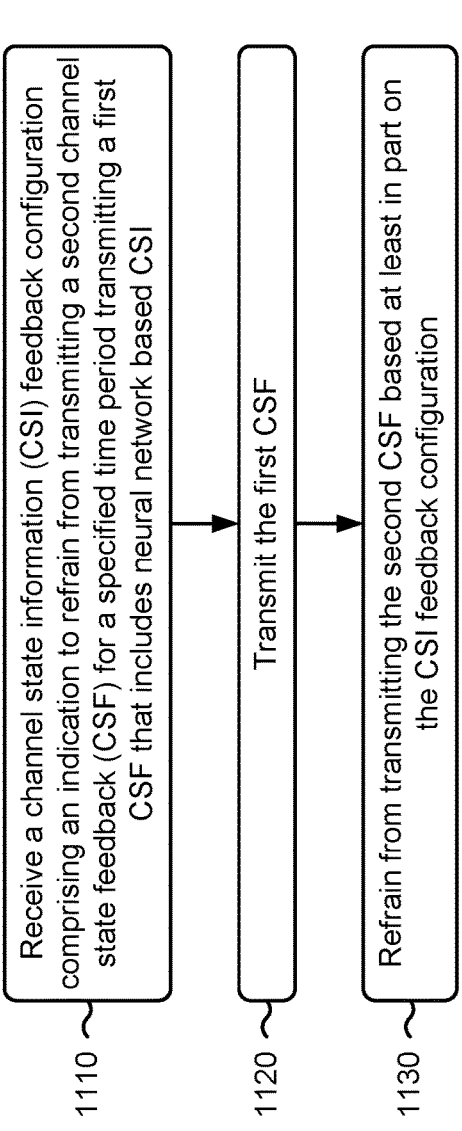

1100

1110
Receive a channel state information (CSI) feedback configuration comprising an indication to refrain from transmitting a second channel state feedback (CSF) for a specified time period transmitting a first CSF that includes neural network based CSI 1120
Transmit the first CSF 1130
Refrain from transmitting the second CSF based at least in part on the CSI feedback configuration

FIG. 11

1210   Transmit a channel state information (CSI) feedback configuration comprising an indication to save a channel state feedback (CSF) that corresponds to a first reference signal carried on a downlink channel for a specified time period 1220   Receive a differential CSF based at least in part on the CSF and a second reference signal carried on the downlink channel

1200

1310 — Transmit a channel state information (CSI) feedback configuration comprising an indication to refrain from transmitting a second channel state feedback (CSF) for a specified time period transmitting a first CSF that includes neural network based CSI 1320 — Receive the first CSF

1300

2000

2010 — Encode a data set using one or more extraction operations and compression operations associated with a neural network, the one or more extraction operations and compression operations being based at least in part on a set of features of the data set to produce a compressed data set 2020 — Transmit the compressed data set to a second device

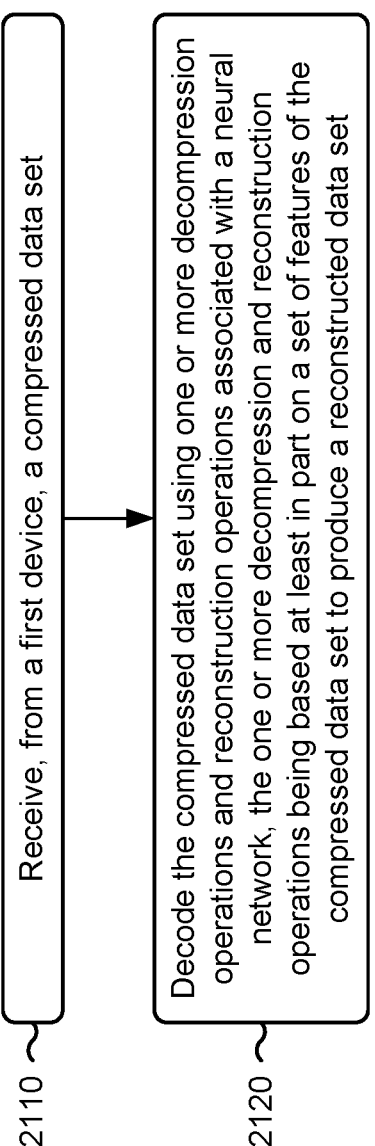

2110   Receive, from a first device, a compressed data set

2120   Decode the compressed data set using one or more decompression operations and reconstruction operations associated with a neural network, the one or more decompression and reconstruction operations being based at least in part on a set of features of the compressed data set to produce a reconstructed data set

CONFIGURATIONS FOR CHANNEL STATE FEEDBACK

CROSS-REFERENCE TO RELATED APPLICATIONS

This Patent Application is a 371 national stage of PCT Application No. PCT/US2021/071188 filed on Aug. 13, 2021, entitled "CONFIGURATIONS FOR CHANNEL STATE FEEDBACK," which claims priority to Greece Patent Application Serial No. 20200100488, filed on Aug. 18, 2020, entitled "CONFIGURATIONS FOR CHANNEL STATE FEEDBACK," and assigned to the assignee hereof. The disclosure of the prior Applications are considered part of and [is] are incorporated by reference into this Patent Application

INTRODUCTION

Aspects of the present disclosure generally relate to wireless communication and to techniques and apparatuses for channel state information reporting.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different UE to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LIE and NR technologies. Preferably, these improvements should be applicable to other multiple access technologies and the telecommunication standards that employ these technologies.

SUMMARY

In some aspects, a method of wireless communication performed by a first device includes receiving a channel state information (CSI) feedback configuration. The CSI feedback configuration comprises an indication to save, for a specified time period, a channel state feedback (CSF) that corresponds to a first reference signal carried on a downlink channel. The method also includes transmitting a differential CSF based at least in part on the CSF and a second reference signal carried on the downlink channel.

In some aspects, a method of wireless communication performed by a first device includes receiving a CSI feedback configuration. The CSI feedback configuration comprises an indication to refrain from transmitting a second CSF for a specified time period after transmitting a first CSF that includes neural network based CSI. The method includes transmitting the first CSF and refraining from transmitting the second CSF based at least in part on the CSI feedback configuration.

In some aspects, a method of wireless communication performed by a second device includes transmitting a CSI feedback configuration comprising an indication to save a CSF that corresponds to a first reference signal carried on a downlink channel for a specified time period. The method includes receiving a differential CSF based at least in part on the CSF and a second reference signal carried on the downlink channel.

In some aspects, a method of wireless communication performed by a second device includes transmitting a CSI feedback configuration comprising an indication to refrain from transmitting a second CSF for a specified time period after transmitting a first CSF that includes neural network based CSI. The method includes receiving the first CSF.

In some aspects, a first device for wireless communication includes a memory; and one or more processors coupled to the memory. The memory and the one or more processors are configured to receive a CSI feedback configuration comprising an indication to save, for a specified time period, a CSF that corresponds to a first reference signal carried on a downlink channel. The memory and the one or more processors may be configured to transmit a differential CSF based at least in part on the CSF and a second reference signal carried on the downlink channel.

In some aspects, a first device for wireless communication includes a memory and one or more processors coupled to the memory. The memory and the one or more processors are configured to receive a CSI feedback configuration comprising an indication to refrain from transmitting a second CSF for a specified time period after transmitting a first CSF that includes neural network based CSI. The memory and the one or more processors may transmit the first CSF and refrain from transmitting the second CSF based at least in part on the CSI feedback configuration.

In some aspects, a second device for wireless communication includes a memory and one or more processors coupled to the memory. The memory and the one or more processors are configured to transmit a CSI feedback configuration comprising an indication to save a CSF that corresponds to a first reference signal carried on a downlink channel for a specified time period. The memory and the one or more processors may receive a differential CSF based at least in part on the CSF and a second reference signal carried on the downlink channel.

In some aspects, a second device for wireless communication includes a memory and one or more processors coupled to the memory. The memory and the one or more processors are configured to transmit a CSI feedback configuration comprising an indication to refrain from transmitting a second channel state feedback CSF for a specified time period after transmitting a first CSF that includes neural network based CSI. The memory and the one or more processors may be configured to receive the first CSF.

In some aspects, a non-transitory computer-readable medium storing a set of instructions for wireless communication includes one or more instructions that, when executed by one or more processors of a first device, cause the first device to receive a CSI feedback configuration comprising an indication to save, for a specified time period, a CSF that corresponds to a first reference signal carried on a downlink channel. The one or more instructions also cause the first device to transmit a differential CSF based at least in part on the CSF and a second reference signal carried on the downlink channel.

In some aspects, a non-transitory computer-readable medium storing a set of instructions for wireless communication includes one or more instructions that, when executed by one or more processors of a first device, cause the first device to receive a CSI feedback configuration comprising an indication to refrain from transmitting a second CSF for a specified time period after transmitting a first CSF that includes neural network based CSI. The one or more instructions cause the first device to transmit the first CSF and refrain from transmitting the second CSF based at least in part on the CSI feedback configuration.

In some aspects, a non-transitory computer-readable medium storing a set of instructions for wireless communication includes one or more instructions that, when executed by one or more processors of a second device, cause the second device to transmit a CSI feedback configuration comprising an indication to save a CSF that corresponds to a first reference signal carried on a downlink channel for a specified time period. The one or more instructions cause the second device to receive a differential CSF based at least in part on the CSF and a second reference signal carried on the downlink channel.

In some aspects, a non-transitory computer-readable medium storing a set of instructions for wireless communication includes one or more instructions that, when executed by one or more processors of a second device, cause the second device to transmit a CSI feedback configuration comprising an indication to refrain from transmitting a second CSF for a specified time period after transmitting a first CSF that includes neural network based CSI. The one or more instructions cause the second device to receive the first CSF.

In some aspects, an apparatus for wireless communication includes means for receiving a CSI feedback configuration comprising an indication to save, for a specified time period, a CSF that corresponds to a first reference signal carried on a downlink channel. The apparatus includes means for transmitting a differential CSF based at least in part on the CSF and a second reference signal carried on the downlink channel.

In some aspects, an apparatus for wireless communication includes means for receiving a CSI feedback configuration comprising an indication to refrain from transmitting a second CSF for a specified time period after transmitting a first CSF that includes neural network based CSI. The apparatus includes means for transmitting the first CSF and means for refraining from transmitting the second CSF based at least in part on the CSI feedback configuration.

In some aspects, an apparatus for wireless communication includes means for transmitting a CSI feedback configuration comprising an indication to save a CSF that corresponds to a first reference signal carried on a downlink channel for a specified time period. The apparatus also includes means for receiving a differential CSF based at least in part on the CSF and a second reference signal carried on the downlink channel.

In some aspects, an apparatus for wireless communication includes means for transmitting a CSI feedback configuration comprising an indication to refrain from transmitting a second CSF for a specified time period after transmitting a first CSF that includes neural network based CSI. The apparatus includes means for receiving the first CSF.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-8 are diagrams illustrating examples associated with encoding and decoding a data set using a neural network for uplink communication, in accordance with the present disclosure.

FIGS. 10-13 are diagrams illustrating example processes associated with configurations for providing CSF using a neural network, in accordance with the present disclosure.

FIGS. 20 and 21 are diagrams illustrating example processes associated with encoding a data set using a neural network for uplink communication, in accordance with the present disclosure.

DETAILED DESCRIPTION

Figure 1:
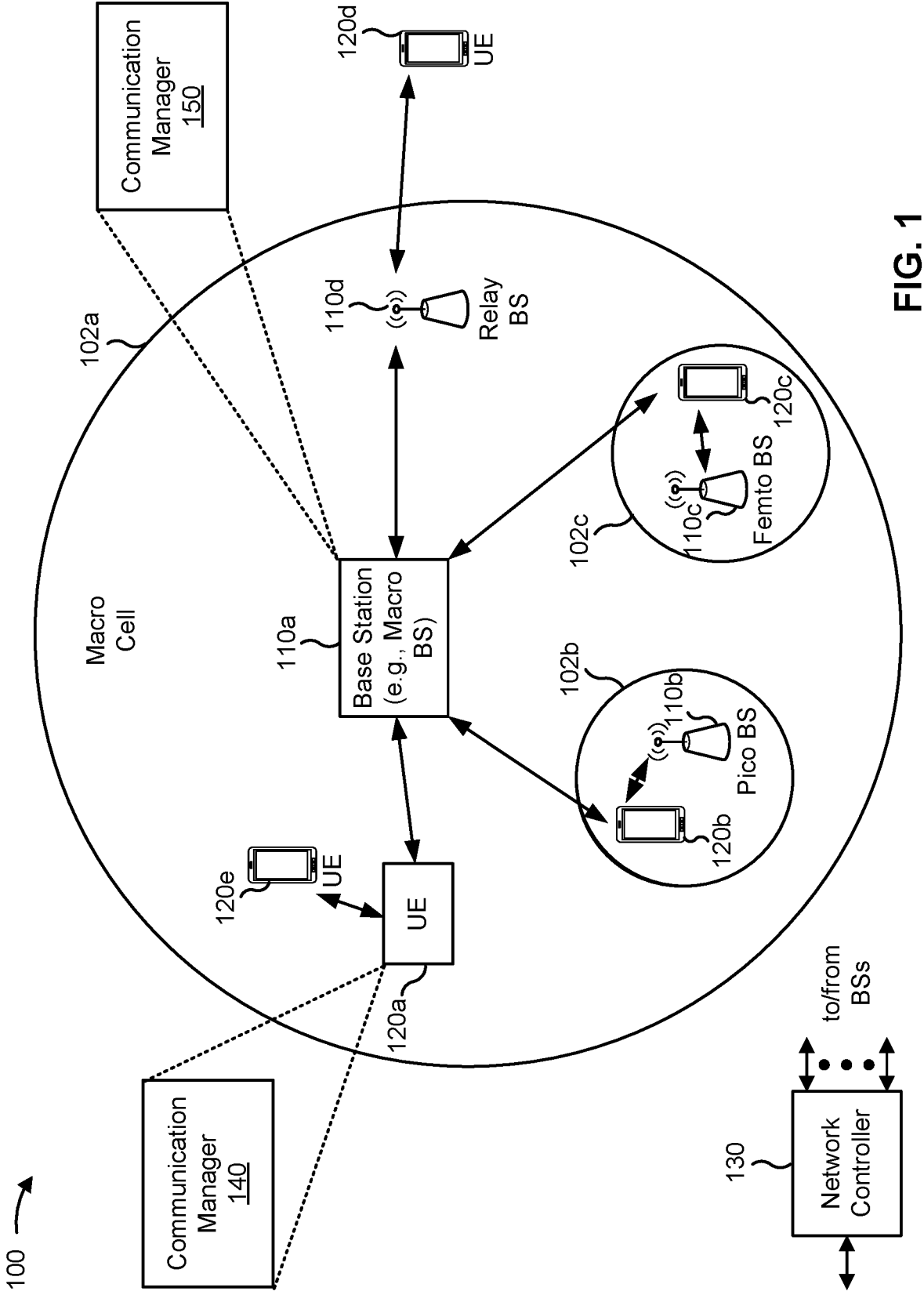
FIG. 1 is a diagram illustrating an example of a wireless network, in accordance with the present disclosure.

An encoding device operating in a network may measure reference signals and/or the like to report to a network entity. For example, the encoding device may measure reference signals during a beam management process for channel state feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information to the base station may consume communication and/or network resources.

In some aspects described herein, an encoding device (e.g., a UE, a base station, a transmit receive point (TRP), a network device, a low-earth orbit (LEO) satellite, a medium-earth orbit (MEO) satellite, a geostationary earth orbit (GEO) satellite, a high elliptical orbit (HEO) satellite, and/or the like) may train one or more neural networks to learn dependence of measured qualities on individual parameters, isolate the measured qualities through various layers of the one or more neural networks (also referred to as "operations"), and compress measurements in a way that limits compression loss. In some aspects, the encoding device may use a nature of a quantity of bits being compressed to construct a process of extraction and compression of each feature (also referred to as a dimension) that affects the quantity of bits. In some aspects, the quantity of bits may be associated with sampling of one or more reference signals and/or may indicate channel state information. For example, the encoding device may encode measurements, to produce compressed measurements, using one or more extraction operations and compression operations associated with a neural network with the one or more extraction operations and compression operations being based at least in part on a set of features of the measurements.

The encoding device may transmit the compressed measurements to a network entity, such as server, a TRP, another UE, a base station, and/or the like. Although examples described herein refer to a base station as the decoding device, the decoding device may be any network entity. The network entity may be referred to as a "decoding device."

The decoding device may decode the compressed measurements using one or more decompression operations and reconstruction operations associated with a neural network. The one or more decompression and reconstruction operations may be based at least in part on a set of features of the compressed data set to produce reconstructed measurements. The decoding device may use the reconstructed measurements as channel state information feedback.

As described herein, an encoding device operating in a network may measure reference signals and/or the like to report to a decoding device. For example, an encoding device may receive a neural network based channel state information (CSI) reference signal (CSI-RS). The encoding device may measure neural network based CSI based at least in part on the CSI-RS. Neural network based CSI may include any number of different features, characteristics, and/or the like. Neural network based CSI may compress the channel information associated with the CSI-RS in a more comprehensive form than, for example, Type-II CSI or Type-I CSI. Type I CSI is a beam selection scheme wherein an encoding device selects best beam indices and sends CSI information to a decoding device. Type II CSI is a beam-combination scheme, where the encoding device also computes a best linear combination of coefficients of various beams and sends back the beam indices and the coefficients used for combining them, on a sub-band (e.g., configured sub-band) basis. For example, in Type-II CSI, the sub-band size may be fixed for all sub-bands, which may result in limited granularity. Neural network based CSI may facilitate greater granularity by facilitating providing information regarding an entire channel. Neural network based CSI also may be specified to compress certain sub-bands with greater accuracy or less accuracy.

In some aspects, neural network based CSI also may facilitate multiple user (MU) multiple input multiple output (MU-MIMO) operation at a decoding device, by facilitating providing information about a channel and interference, thereby enabling the decoding device to manage and group users, and/or the like. Machine-learning based reporting of CSF may facilitate the use of neural network based CSI, more robust Type-II CSI, and/or the like. However, in a typical case, CSI feedback of one type may be scheduled and/or requested shortly after an encoding device has transmitted CSI feedback of the same type or another type. As a result, signaling overhead may be increased for the transmission of redundant information, which may reduce efficiency and uplink resource availability.

According to aspects of the techniques and apparatuses described herein, an encoding device may be configured to save CSF that corresponds to a first reference signal for a specified period of time. The encoding device may use the saved CSF to facilitate transmitting a differential CSF based at least in part on a second reference signal. In some aspects, an encoding device may be configured to refrain from transmitting an additional CSF for a specified time period after transmitting a neural network based CSF. In some aspects, neural networks may be used for compressing and encoding channel information and interference information to provide robust CSF so that information sent in an initial CSF may be sufficient for a specified period of time, or so that the information may be supplemented by a differential CSF rather than a full CSF transmission. As a result, aspects described herein may facilitate reduction of uplink traffic overhead, thereby increasing uplink resource availability while providing decoding devices robust CSI for facilitating traffic management.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LIE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a communication manager 140. As described in more detail elsewhere herein, the communication manager 140 may receive a channel state information (CSI) feedback configuration comprising an indication to save, for a specified time period, a channel state feedback (CSF) that corresponds to a first reference signal carried on a downlink channel; and transmit a differential CSF based at least in part on the CSF and a second reference signal carried on the downlink channel. In some aspects, the communication manager 140 may receive a CSI feedback configuration comprising an indication to refrain from transmitting a second CSF for a specified time period after transmitting a first CSF that includes neural network based CSI; transmit the first CSF; and refrain from transmitting the second CSF based at least in part on the CSI feedback configuration. Additionally, or alternatively, the communication manager 140 may perform one or more other operations described herein.

In some aspects, the base station 110 may include a communication manager 150. As described in more detail elsewhere herein, the communication manager 150 may transmit a CSI feedback configuration comprising an indication to save a CSF that corresponds to a first reference signal carried on a downlink channel for a specified time period; and receive a differential CSF based at least in part on the CSF and a second reference signal carried on the downlink channel. In some aspects, the communication manager 150 may transmit a CSI feedback configuration comprising an indication to refrain from transmitting a second CSF for a specified time period after transmitting a first CSF that includes neural network based CSI; and receive the first CSF. Additionally, or alternatively, the communication manager 150 may perform one or more other operations described herein.

As indicated above, FIG. 1 is provided merely as an example. Other examples may differ from what is described with regard to FIG. 1.

Figure 2:
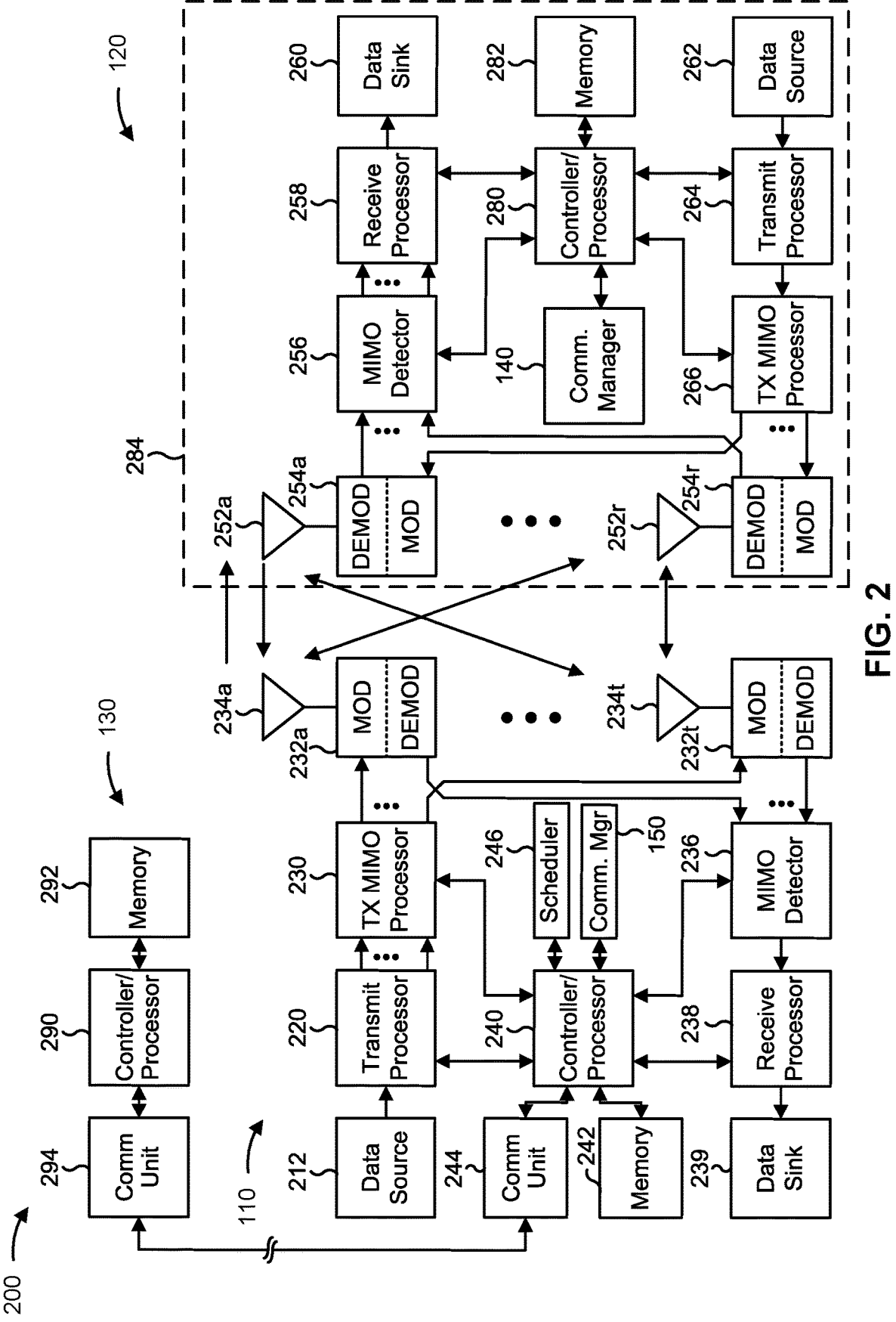
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with configurations for providing channel state feedback (CSF), as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, the UE 120 may include means for receiving a CSI feedback configuration comprising an indication to save, for a specified time period, a CSF that corresponds to a first reference signal carried on a downlink channel, means for transmitting a differential CSF based at least in part on the CSF and a second reference signal carried on the downlink channel, and/or the like. In some aspects, the UE 120 may include means for receiving a CSI feedback configuration comprising an indication to refrain from transmitting a second CSF for a specified time period after transmitting a first CSF that includes neural network based CSI, means for transmitting the first CSF, means for refraining from transmitting the second CSF based at least in part on the CSI feedback configuration, and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, the base station 110 may include means for transmitting a CSI feedback configuration comprising an indication to save a CSF that corresponds to a first reference signal carried on a downlink channel for a specified time period, means for receiving a differential CSF based at least in part on the CSF and a second reference signal carried on the downlink channel, and/or the like. In some aspects, the base station 110 may include means for transmitting a CSI feedback configuration comprising an indication to refrain from transmitting a second CSF for a specified time period after transmitting a first CSF that includes neural network based CSI, means for receiving the first CSF, and/or the like. Additionally, or alternatively, the base station 110 may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
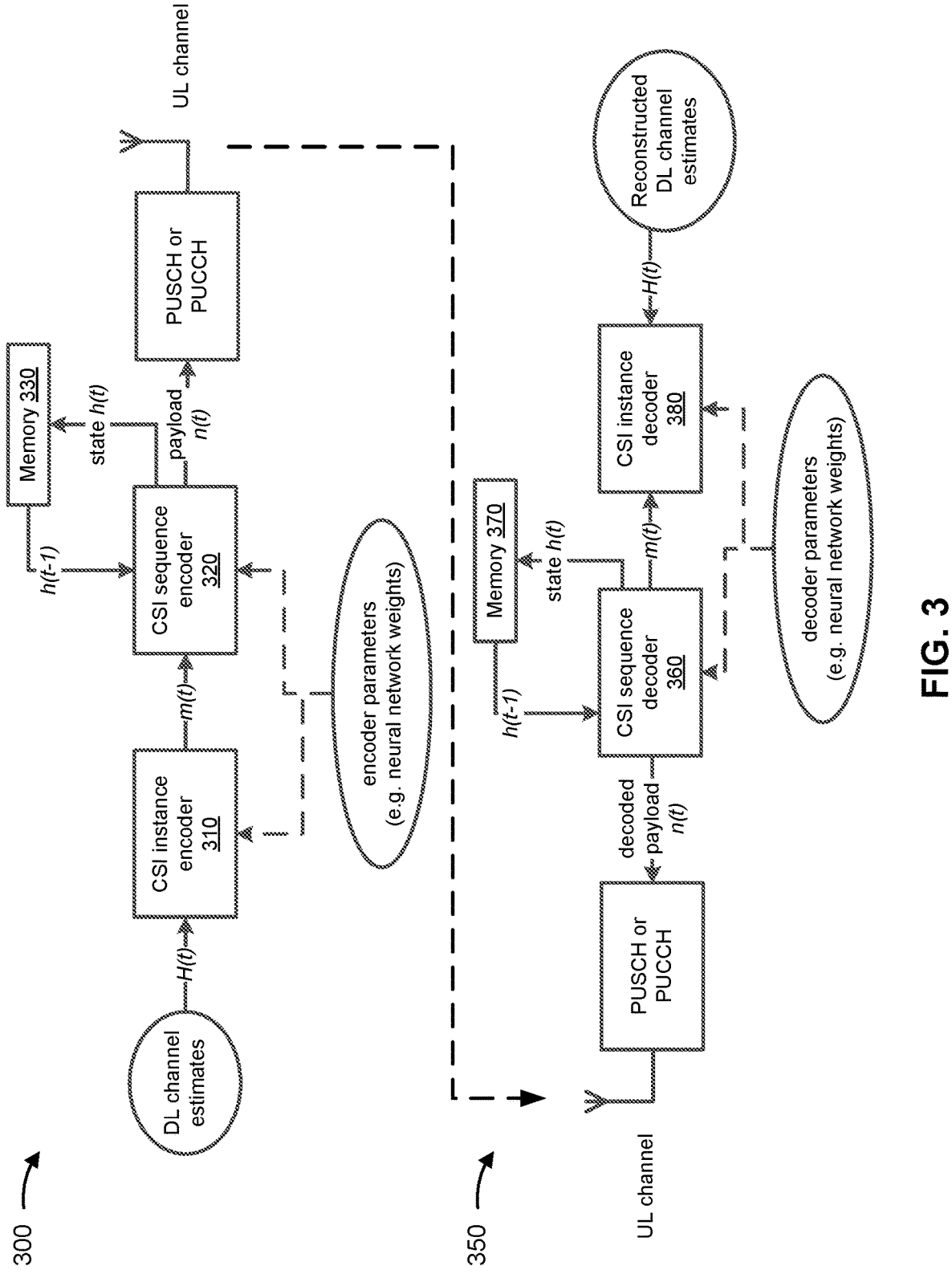
FIG. 3 is a diagram illustrating an example of an encoding device and a decoding device that use previously stored channel state information, in accordance with the present disclosure.

FIG. 3 illustrates an example of an encoding device 300 and a decoding device 350 that use previously stored channel state information (CSI), in accordance with the present disclosure. FIG. 3 shows the encoding device 300 (e.g., UE 120) with a CSI instance encoder 310, a CSI sequence encoder 320, and a memory 330. FIG. 3 also shows the decoding device 350 (e.g., BS 110) with a CSI sequence decoder 360, a memory 370, and a CSI instance decoder 380.

In some aspects, the encoding device 300 and the decoding device 350 may take advantage of a correlation of CSI instances over time (temporal aspect), or over a sequence of CSI instances for a sequence of channel estimates. The encoding device 300 and the decoding device 350 may save and use previously stored CSI and encode and decode only a change in the CSI from a previous instance. This may provide for less CSI feedback overhead and improve performance. The encoding device 300 may also be able to encode more accurate CSI, and neural networks may be trained with more accurate CSI.

As shown in FIG. 3, CSI instance encoder 310 may encode a CSI instance into intermediate encoded CSI for each DL channel estimate in a sequence of DL channel estimates. CSI instance encoder 310 (e.g., a feedforward network) may use neural network encoder weights θ. The intermediate encoded CSI may be represented as $m(t) \triangleq f_{enc,\theta}(H(t))$. CSI sequence encoder 320 (e.g., a Long Short-Term Memory (LSTM) network) may determine a previously encoded CSI instance h(t−1) from memory 330 and compare the intermediate encoded CSI m(t) and the previously encoded CSI instance h(t−1) to determine a change n(t) in the encoded CSI. The change n(t) may be a part of a channel estimate that is new and may not be predicted by the decoding device 350. The encoded CSI at this point may be represented by $[n(t), h_{enc}(t)] \triangleq g_{enc,\theta}(m(t), h_{enc}(t-1))$. CSI sequence encoder 320 may provide this change n(t) on the physical uplink shared channel (PUSCH) or the physical uplink control channel (PUCCH), and the encoding device 300 may transmit the change (e.g., information indicating the change) n(t) as the encoded CSI on the UL channel to the decoding device 350. Because the change is smaller than an entire CSI instance, the encoding device 300 may send a smaller payload for the encoded CSI on the UL channel, while including more detailed information in the encoded CSI for the change. CSI sequence encoder 320 may generate encoded CSI h(t) based at least in part on the intermediate encoded CSI m(t) and at least a portion of the previously encoded CSI instance h(t−1). CSI sequence encoder 320 may save the encoded CSI h(t) in memory 330.

CSI sequence decoder 360 may receive encoded CSI on the PUSCH or PUCCH. CSI sequence decoder 360 may determine that only the change n(t) of CSI is received as the encoded CSI. CSI sequence decoder 360 may determine an intermediate decoded CSI m(t) based at least in part on the encoded CSI and at least a portion of a previous intermediate decoded CSI instance h(t−1) from memory 370 and the change. CSI instance decoder 380 may decode the intermediate decoded CSI m(t) into decoded CSI. CSI sequence decoder 360 and CSI instance decoder 380 may use neural network decoder weights φ. The intermediate decoded CSI may be represented by $[\hat{m}(t), h_{dec}(t)] \triangleq g_{dec,\phi}(n(t), h_{dec}(t-1))$. CSI sequence decoder 360 may generate decoded CSI h(t) based at least in part on the intermediate decoded CSI m(t) and at least a portion of the previously decoded CSI instance h(t−1). The decoding device 350 may reconstruct a DL channel estimate from the decoded CSI h(t), and the reconstructed channel estimate may be represented as $\hat{H}(t) \triangleq f\_$ (dec, φ) $(\hat{m}(t))$. CSI sequence decoder 360 may save the decoded CSI h(t) in memory 370.

Because the change n(t) is smaller than an entire CSI instance, the encoding device 300 may send a smaller payload on the UL channel. For example, if the DL channel has changed little from previous feedback, due to a low Doppler or little movement by the encoding device 300, an output of the CSI sequence encoder may be rather compact. In this way, the encoding device 300 may take advantage of a correlation of channel estimates over time. In some aspects, because the output is small, the encoding device 300 may include more detailed information in the encoded CSI for the change. In some aspects, the encoding device 300 may transmit an indication (e.g., flag) to the decoding device 350 that the encoded CSI is temporally encoded (a CSI change). Alternatively, the encoding device 300 may transmit an indication that the encoded CSI is encoded independently of any previously encoded CSI feedback. The decoding device 350 may decode the encoded CSI without using a previously decoded CSI instance. In some aspects, a device, which may include the encoding device 300 or the decoding device 350, may train a neural network model using a CSI sequence encoder and a CSI sequence decoder.

In some aspects, CSI may be a function of a channel estimate (referred to as a channel response) H and interference N. There may be multiple ways to convey H and N. For example, the encoding device 300 may encode the CSI as $N^{-1/2}H$. The encoding device 300 may encode H and N separately. The encoding device 300 may partially encode H and N separately, and then jointly encode the two partially encoded outputs. Encoding H and N separately maybe advantageous. Interference and channel variations may happen on different time scales. In a low Doppler scenario, a channel may be steady but interference may still change faster due to traffic or scheduler algorithms. In a high Doppler scenario, the channel may change faster than a scheduler-grouping of UEs. In some aspects, a device, which may include the encoding device 300 or the decoding device 350, may train a neural network model using separately encoded H and N.

In some aspects, a reconstructed DL channel $\hat{H}$ may faithfully reflect the DL channel H, and this may be called explicit feedback. In some aspects, $\hat{H}$ may capture only that information required for the decoding device 350 to derive rank and precoding. CQI may be fed back separately. CSI feedback may be expressed as m(t), or as n(t) in a scenario of temporal encoding. Similarly to Type-II CSI feedback, m(t) may be structured to be a concatenation of rank index (RI), beam indices, and coefficients representing amplitudes or phases. In some aspects, m(t) may be a quantized version of a real-valued vector. Beams may be pre-defined (not obtained by training), or may be a part of the training (e.g., part of θ and φ and conveyed to the encoding device 300 or the decoding device 350).

In some aspects, the decoding device 350 and the encoding device 300 may maintain multiple encoder and decoder networks, each targeting a different payload size (for varying accuracy vs. UL overhead tradeoff). For each CSI feedback, depending on a reconstruction quality and an uplink budget (e.g., PUSCH payload size), the encoding device 300 may choose, or the decoding device 350 may instruct the encoding device 300 to choose, one of the encoders to construct the encoded CSI. The encoding device 300 may send an index of the encoder along with the CSI based at least in part on an encoder chosen by the encoding device 300. Similarly, the decoding device 350 and the encoding device 300 may maintain multiple encoder and decoder networks to cope with different antenna geometries and channel conditions. Note that while some operations are described for the decoding device 350 and the encoding device 300, these operations may also be performed by another device, as part of a preconfiguration of encoder and decoder weights and/or structures.

As indicated above, FIG. 3 may be provided as an example. Other examples may differ from what is described with regard to FIG. 3.

Figure 4:
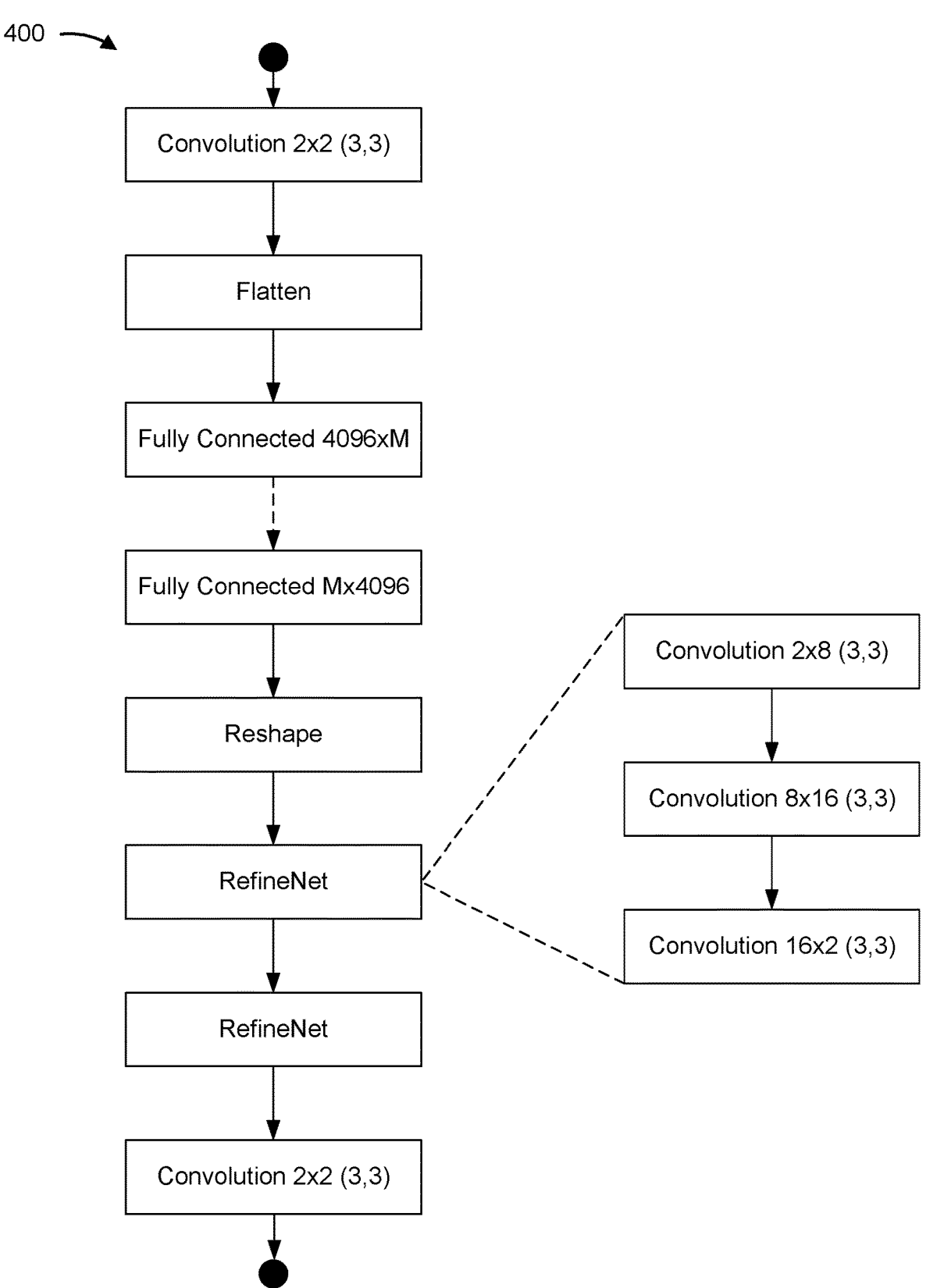
FIG. 4 is a diagram illustrating an example associated with an encoding device and a decoding device, in accordance with the present disclosure.

FIG. 4 is a diagram illustrating an example 400 associated with an encoding device and a decoding device, in accordance with the present disclosure. The encoding device (e.g., UE 120, encoding device 300, and/or the like) may be configured to perform one or more operations on data to compress the data. The decoding device (e.g., base station 110, decoding device 350, and/or the like) may be configured to decode the compressed data to determine information.

As used herein, a "layer" of a neural network is used to denote an operation on input data. For example, a convolution layer, a fully connected layer, and/or the like denote associated operations on data that is input into a layer. A convolution A×B operation refers to an operation that converts a number of input features A into a number of output features B. "Kernel size" refers to a number of adjacent coefficients that are combined in a dimension.

As used herein, "weight" is used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values.

As shown in example 400, the encoding device may perform a convolution operation on samples. For example, the encoding device may receive a set of bits structured as a 2×64×32 data set that indicates IQ sampling for tap features (e.g., associated with multipath timing offsets) and spatial features (e.g., associated with different antennas of the encoding device). The convolution operation may be a 2×2 operation with kernel sizes of 3 and 3 for the data structure. The output of the convolution operation may be input to a batch normalization (BN) layer followed by a LeakyReLU activation, giving an output data set having dimensions 2×64×32. The encoding device may perform a flattening operation to flatten the bits into a 4096 bit vector. The encoding device may apply a fully connected operation, having dimensions 4096×M, to the 4096 bit vector to output a payload of M bits. The encoding device may transmit the payload of M bits to the decoding device.

The decoding device may apply a fully connected operation, having dimensions M×4096, to the M bit payload to output a 4096 bit vector. The decoding device may reshape the 4096 bit vector to have dimension 2×64×32. The decoding device may apply one or more refinement network (RefineNet) operations on the reshaped bit vector. For example, a RefineNet operation may include application of a 2×8 convolution operation (e.g., with kernel sizes of 3 and 3) with output that is input to a BN layer followed by a LeakyReLU activation that produces an output data set having dimensions 8×64×32, application of an 8×16 convolution operation (e.g., with kernel sizes of 3 and 3) with output that is input to a BN layer followed by a LeakyReLU activation that produces an output data set having dimensions 16×64×32, and/or application of a 16×2 convolution operation (e.g., with kernel sizes of 3 and 3) with output that is input to a BN layer followed by a LeakyReLU activation that produces an output data set having dimensions 2×64×32. The decoding device may also apply a 2×2 convolution operation with kernel sizes of 3 and 3 to generate decoded and/or reconstructed output.

As indicated above, FIG. 4 is provided merely as an example. Other examples may differ from what is described with regard to FIG. 4.

As described herein, an encoding device operating in a network may measure reference signals and/or the like to report to a decoding device. For example, a UE may measure reference signals during a beam management process to report channel state information feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like.

In some aspects described herein, an encoding device (e.g., a UE) may train one or more neural networks to learn dependence of measured qualities on individual parameters, isolate the measured qualities through various layers of the one or more neural networks (also referred to as "operations"), and compress measurements in a way that limits compression loss.

In some aspects, the encoding device may use a nature of a quantity of bits being compressed to construct a process of extraction and compression of each feature (also referred to as a dimension) that affects the quantity of bits. In some aspects, the quantity of bits may be associated with sampling of one or more reference signals and/or may indicate channel state information.

Based at least in part on encoding and decoding a data set using a neural network for uplink communication, the encoding device may transmit CSF with a reduced payload. This may conserve network resources that may otherwise have been used to transmit a full data set as sampled by the encoding device.

Figure 5:
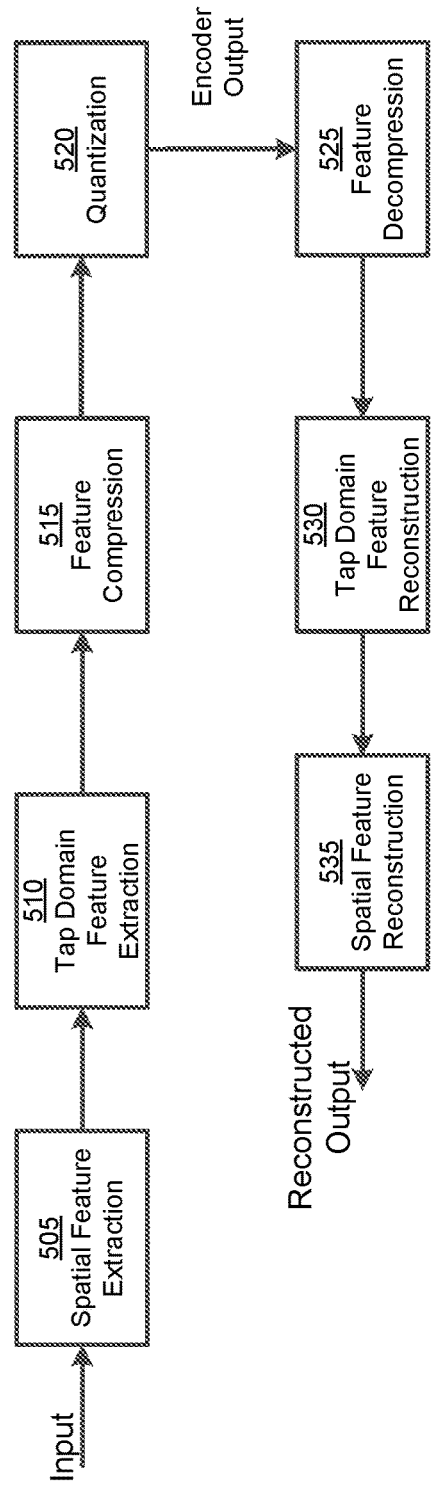

FIG. 5 is a diagram illustrating an example 500 associated with encoding and decoding a data set using a neural network for uplink communication, in accordance with the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF.

In some aspects, the encoding device may identify a feature to compress. In some aspects, the encoding device may perform a first type of operation in a first dimension associated with the feature to compress. The encoding device may perform a second type of operation in other dimensions (e.g., in all other dimensions). For example, the encoding device may perform a fully connected operation on the first dimension and convolution (e.g., pointwise convolution) in all other dimensions.

In some aspects, the reference numbers identify operations that include multiple neural network layers and/or operations. Neural networks of the encoding device and the decoding device may be formed by concatenation of one or more of the referenced operations.

As shown by reference number 505, the encoding device may perform a spatial feature extraction on the data. As shown by reference number 510, the encoding device may perform a tap domain feature extraction on the data. In some aspects, the encoding device may perform the tap domain feature extraction before performing the spatial feature extraction. In some aspects, an extraction operation may include multiple operations. For example, the multiple operations may include one or more convolution operations, one or more fully connected operations, and/or the like, that may be activated or inactive. In some aspects, an extraction operation may include a residual neural network (ResNet) operation.

As shown by reference number 515, the encoding device may compress one or more features that have been extracted. In some aspects, a compression operation may include one or more operations, such as one or more convolution operations, one or more fully connected operations, and/or the like. After compression, a bit count of an output may be less than a bit count of an input.

As shown by reference number 520, the encoding device may perform a quantization operation. In some aspects, the encoding device may perform the quantization operation after flattening the output of the compression operation and/or performing a fully connected operation after flattening the output.

As shown by reference number 525, the decoding device may perform a feature decompression. As shown by reference number 530, the decoding device may perform a tap domain feature reconstruction. As shown by reference number 535, the decoding device may perform a spatial feature reconstruction. In some aspects, the decoding device may perform spatial feature reconstruction before performing tap domain feature reconstruction. After the reconstruction operations, the decoding device may output the reconstructed version of the encoding device's input.

In some aspects, the decoding device may perform operations in an order that is opposite to operations performed by the encoding device. For example, if the encoding device follows operations (a, b, c, d), the decoding device may follow inverse operations (D, C, B, A). In some aspects, the decoding device may perform operations that are fully symmetric to operations of the encoding device. This may reduce a number of bits needed for neural network configuration at the UE. In some aspects, the decoding device may perform additional operations (e.g., convolution operations, fully connected operation, ResNet operations, and/or the like) in addition to operations of the encoding device. In some aspects, the decoding device may perform operations that are asymmetric to operations of the encoding device.

Based at least in part on the encoding device encoding a data set using a neural network for uplink communication, the encoding device (e.g., a UE) may transmit CSF with a reduced payload. This may conserve network resources that may otherwise have been used to transmit a full data set as sampled by the encoding device.

As indicated above, FIG. 5 is provided merely as an example. Other examples may differ from what is described with regard to FIG. 5.

Figure 6:
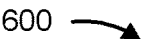

FIG. 6 is a diagram illustrating an example 600 associated with encoding and decoding a data set using a neural network for uplink communication, in accordance with the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF.

As shown by example 600, the encoding device may receive sampling from antennas. For example, the encoding device may receive a 64×64 dimension data set based at least in part on a number of antennas, a number of samples per antenna, and a tap feature.

The encoding device may perform a spatial feature extraction, a short temporal (tap) feature extraction, and/or the like. In some aspects, this may be accomplished through the use of a 1-dimensional convolutional operation, that is fully connected in the spatial dimension (to extract the spatial feature) and simple convolution with a small kernel size (e.g., 3) in the tap dimension (to extract the short tap feature). Output from such a 64×W 1-dimensional convolution operation may be a W×64 matrix.

The encoding device may perform one or more ResNet operations. The one or more ResNet operations may further refine the spatial feature and/or the temporal feature. In some aspects, a ResNet operation may include multiple operations associated with a feature. For example, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensinoal convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The encoding device may perform a W×V convolution operation on output from the one or more ResNet operations. The W×V convolution operation may include a pointwise (e.g., tap-wise) convolution operation. The W×V convolution operation may compress spatial features into a reduced dimension for each tap. The W×V convolution operation has an input of W features and an output of V features. Output from the W×V convolution operation may be a V×64 matrix.

The encoding device may perform a flattening operation to flatten the V×64 matrix into a 64V element vector. The encoding device may perform a 64V×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64V fully connected operation to decompress the low dimension vector of size M into a spatial-temporal feature data set. The decoding device may perform a reshaping operation to reshape the 64V element vector into a 2-dimensional V×64 matrix. The decoding device may perform a V×W (with kernel of 1) convolution operation on output from the reshaping operation. The V×W convolution operation may include a pointwise (e.g., tap-wise) convolution operation. The V×W convolution operation may decompress spatial features from a reduced dimension for each tap. The V×W convolution operation has an input of V features and an output of W features. Output from the V×W convolution operation may be a W×64 matrix.

The decoding device may perform one or more ResNet operations. The one or more ResNet operations may further decompress the spatial feature and/or the temporal feature. In some aspects, a ResNet operation may include multiple (e.g., 3) 1-dimensional convolution operations, a skip connection (e.g., to avoid application of the 1-dimensional convolution operations), a summation operation of a path through the multiple convolution operations and a path through the skip connection, and/or the like. Output from the one or more ResNet operations may be a W×64 matrix.

The decoding device may perform a spatial and temporal feature reconstruction. In some aspects, this may be accomplished through the use of a 1-dimensional convolutional operation that is fully connected in the spatial dimension (to reconstruct the spatial feature) and simple convolution with a small kernel size (e.g., 3) in the tap dimension (to reconstruct the short tap feature). Output from the 64×W convolution operation may be a 64×64 matrix.

In some aspects, values of M, W, and/or V may be configurable to adjust weights of the features, payload size, and/or the like.

As indicated above, FIG. 6 is provided merely as an example. Other examples may differ from what is described with regard to FIG. 6.

Figure 7:
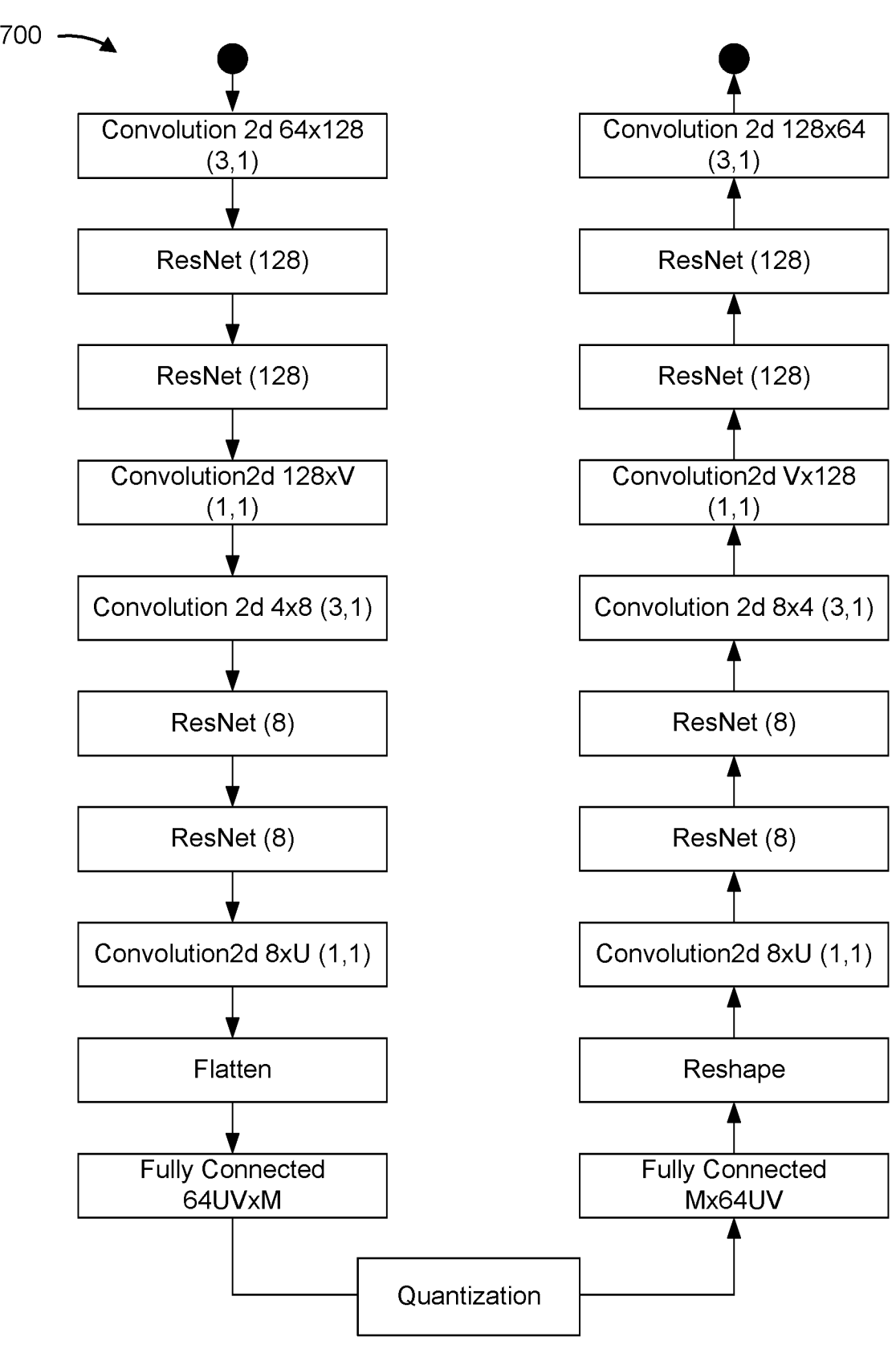

FIG. 7 is a diagram illustrating an example 700 associated with encoding and decoding a data set using a neural network for uplink communication, in accordance with the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF. As shown by example 700, features may be compressed and decompressed in sequence. For example, the encoding device may extract and compress features associated with the input to produce a payload, and then the decoding device may extract and compress features associated with the payload to reconstruct the input. The encoding and decoding operations may be symmetric (as shown) or asymmetric.

As shown by example 700, the encoding device may receive sampling from antennas. For example, the encoding device may receive a 256×64 dimension data set based at least in part on a number of antennas, a number of samples per antenna, and a tap feature. The encoding device may reshape the data to a (64×64×4) data set.

The encoding device may perform a 2-dimensional 64×128 convolution operation (with kernel sizes of 3 and 1). In some aspects, the 64×128 convolution operation may perform a spatial feature extraction associated with the decoding device antenna dimension, a short temporal (tap) feature extraction associated with the decoding device (e.g., base station) antenna dimension, and/or the like. In some aspects, this may be accomplished through the use of a 2D convolutional layer that is fully connected in a decoding device antenna dimension, a simple convolutional operation with a small kernel size (e.g., 3) in the tap dimension and a small kernel size (e.g., 1) in the encoding device antenna dimension. Output from the 64×W convolution operation may be a (128×64×4) dimension matrix.

The encoding device may perform one or more ResNet operations. The one or more ResNet operations may further refine the spatial feature associated with the decoding device and/or the temporal feature associated with the decoding device. In some aspects, a ResNet operation may include multiple operations associated with a feature. For example, a ResNet operation may include multiple (e.g., 3) 2-dimensional convolution operations, a skip connection (e.g., between input of the ResNet to output of the ResNet to avoid application of the 2-dimensional convolution operations), a summation operation of a path through the multiple 2-dimensional convolution operations and a path through the skip connection, and/or the like. In some aspects, the multiple 2-dimensional convolution operations may include a W×2W convolution operation with kernel sizes 3 and 1 with output that is input to a BN layer followed by a LeakyReLU activation that produces an output data set of dimension 2 W×64×V, a 2 W×4 W convolution operation with kernel sizes 3 and 1 with output that is input to a BN layer followed by a LeakyReLU activation that produces an output data set of dimension 4 W×64×V, and 4 W×W convolution operation with kernel sizes 3 and 1 that outputs a BN data set of dimension (128×64×4). Output from the one or more ResNet operations may be a (128×64×4) dimension matrix.

The encoding device may perform a 2-dimensional 128×V convolution operation (with kernel sizes of 1 and 1) on output from the one or more ResNet operations. The 128×V convolution operation may include a pointwise (e.g., tap-wise) convolution operation. The W×V convolution operation may compress spatial features associated with the decoding device into a reduced dimension for each tap. Output from the 128×V convolution operation may be a (4×64×V) dimension matrix.

The encoding device may perform a 2-dimensional 4×8 convolution operation (with kernel sizes of 3 and 1). In some aspects, the 4×8 convolution operation may perform a spatial feature extraction associated with the encoding device antenna dimension, a short temporal (tap) feature extraction associated with the encoding device antenna dimension, and/or the like. Output from the 4×8 convolution operation may be a (8×64×V) dimension matrix.

The encoding device may perform one or more ResNet operations. The one or more ResNet operations may further refine the spatial feature associated with the encoding device and/or the temporal feature associated with the encoding device. In some aspects, a ResNet operation may include multiple operations associated with a feature. For example, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension matrix.

The encoding device may perform a 2-dimensional 8×U convolution operation (with kernel sizes of 1 and 1) on output from the one or more ResNet operations. The 8×U convolution operation may include a pointwise (e.g., tap-wise) convolution operation. The 8×U convolution operation may compress spatial features associated with the decoding device into a reduced dimension for each tap. Output from the 128×V convolution operation may be a (U×64×V) dimension matrix.

The encoding device may perform a flattening operation to flatten the (U×64×V) dimension matrix into a 64 UV element vector. The encoding device may perform a 64UV×M fully connected operation to further compress a 2-dimentional spatial-temporal feature data set into a low dimension vector of size/14 for transmission over the air to the decoding device. The encoding device may perform quantization before the over the air transmission of the low dimension vector of size M to map sampling of the transmission into discrete values for the low dimension vector of size M.

The decoding device may perform an M×64 UV fully connected operation to decompress the low dimension vector of size M into a spatial-temporal feature data set. The decoding device may perform a reshaping operation to reshape the 64 UV element vector into a (U×64×V) dimensional matrix. The decoding device may perform a 2-dimensional U×8 (with kernel of 1, 1) convolution operation on output from the reshaping operation. The U×8 convolution operation may include a pointwise (e.g., tap-wise) convolution operation. The U×8 convolution operation may decompress spatial features from a reduced dimension for each tap. Output from the U×8 convolution operation may be a (8×64×V) dimension data set.

The decoding device may perform one or more ResNet operations. The one or more ResNet operations may further decompress the spatial feature and/or the temporal feature associated with the encoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension data set.

The decoding device may perform a 2-dimensional 8×4 convolution operation (with kernel sizes of 3 and 1). In some aspects, the 8×4 convolution operation may perform a spatial feature reconstruction in the encoding device antenna dimension, and a short temporal feature reconstruction, and/or the like. Output from the 8×4 convolution operation may be a (V×64×4) dimension data set.

The decoding device may perform a 2-dimensional V×128 (with kernel of 1) convolution operation on output from the 2-dimensional 8×4 convolution operation to reconstruct a tap feature and a spatial feature associated with the decoding device. The V×128 convolution operation may include a pointwise (e.g., tap-wise) convolution operation. The V×128 convolution operation may decompress spatial features associated with the decoding device antennas from a reduced dimension for each tap. Output from the U×8 convolution operation may be a (128×64×4) dimension matrix.

The decoding device may perform one or more ResNet operations. The one or more ResNet operations may further decompress the spatial feature and/or the temporal feature associated with the decoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (128×64×4) dimension matrix.

The decoding device may perform a 2-dimensional 128×64 convolution operation (with kernel sizes of 3 and 1). In some aspects, the 128×64 convolution operation may perform a spatial feature reconstruction associated with the decoding device antenna dimension, a short temporal feature reconstruction, and/or the like. Output from the 128×64 convolution operation may be a (64×64×4) dimension data set.

In some aspects, values of M, V, and/or U may be configurable to adjust weights of the features, payload size, and/or the like. For example, a value of M may be 32, 64, 128, 256, or 512, a value of V may be 16, and/or a value of U may be 1.

As indicated above, FIG. 7 is provided merely as an example. Other examples may differ from what is described with regard to FIG. 7.

FIG. 8 is a diagram illustrating an example 800 associated with encoding and decoding a data set using a neural network for uplink communication, in accordance with the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF. The encoding device and decoding device operations may be asymmetric. In other words, the decoding device may have a greater number of layers than the decoding device.

As shown by example 800, the encoding device may receive sampling from antennas. For example, the encoding device may receive a 64×64 dimension data set based at least in part on a number of antennas, a number of samples per antenna, and a tap feature.

The encoding device may perform a 64×W convolution operation (with a kernel size of 1). In some aspects, the 64×W convolution operation may be fully connected in antennas, convolution in taps, and/or the like. Output from the 64×W convolution operation may be a W×64 matrix. The encoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the one or more W×W convolution operations may perform a spatial feature extraction, a short temporal (tap) feature extraction, and/or the like. In some aspects, the W×W convolution operations may be a series of 1-dimensional convolution operations.

The encoding device may perform a flattening operation to flatten the W×64 matrix into a 64W element vector. The encoding device may perform a 4096×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform a 4096×M fully connected operation to decompress the low dimension vector of size M into a spatial-temporal feature data set. The decoding device may perform a reshaping operation to reshape the 6W element vector into a W×64 matrix.

The decoding device may perform one or more ResNet operations. The one or more ResNet operations may decompress the spatial feature and/or the temporal feature. In some aspects, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensinoal convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The decoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the W×W convolution operations may perform a spatial feature reconstruction, a short temporal (tap) feature reconstruction, and/or the like. In some aspects, the W×W convolution operations may be a series of 1-dimensional convolution operations.

The encoding device may perform a W×64 convolution operation (with a kernel size of 1). In some aspects, the W×64 convolution operation may be a 1-dimensional convolution operation. Output from the 64×W convolution operation may be a 64×64 matrix.

In some aspects, values of M, and/or W may be configurable to adjust weights of the features, payload size, and/or the like.

As indicated above, FIG. 8 is provided merely as an example. Other examples may differ from what is described with regard to FIG. 8.

As described herein, an encoding device operating in a network may measure reference signals and/or the like to report to a decoding device. For example, an encoding device may receive a neural network based channel state information (CSI) reference signal (CSI-RS). The encoding device may measure neural network based CSI based at least in part on the CSI-RS. In some aspects, neural network based CSI may compress the channel information associated with the CSI-RS in a more comprehensive form than, for example, Type-II CSI or Type-I CSI. For example, in Type-II CSI, the sub-band size may be fixed for all sub-bands, which may result in limited granularity. Neural network based CSI may facilitate greater granularity by facilitating providing information regarding an entire channel. Neural network based CSI also may be specified to compress certain sub-bands with greater accuracy or less accuracy.

In some aspects, neural network based CSI also may facilitate multiple user (MU) multiple input multiple output (MU-MIMO) operation at a decoding device, by facilitating providing information about a channel and interference, thereby enabling the decoding device to manage and group users, and/or the like. Machine-learning based reporting of CSF may facilitate the use of neural network based CSI, more robust Type-II CSI, and/or the like. However, in a typical case, CSI feedback of one type may be scheduled and/or requested shortly after an encoding device has trans-mitted CSI feedback of the same type or another type. As a result, signaling overhead may be increased for the trans-mission of redundant information, which may reduce effi-ciency and uplink resource availability.

According to aspects of the techniques and apparatuses described herein, an encoding device may be configured to save CSF that corresponds to a first reference signal for a specified period of time. The encoding device may use the saved CSF to facilitate transmitting a differential CSF based at least in part on a second reference signal. In some aspects, an encoding device may be configured to refrain from transmitting an additional CSF for a specified time period after transmitting a neural network based CSF. In some aspects, neural networks may be used for compressing and encoding channel information and interference information to provide robust CSF so that information sent in an initial CSF may be sufficient for a specified period of time, or so that the information may be supplemented by a differential CSF rather than a full CSF transmission. As a result, aspects described herein may facilitate reduction of uplink traffic overhead, thereby increasing uplink resource availability while providing decoding devices robust CSI for facilitating traffic management.

Figure 9:
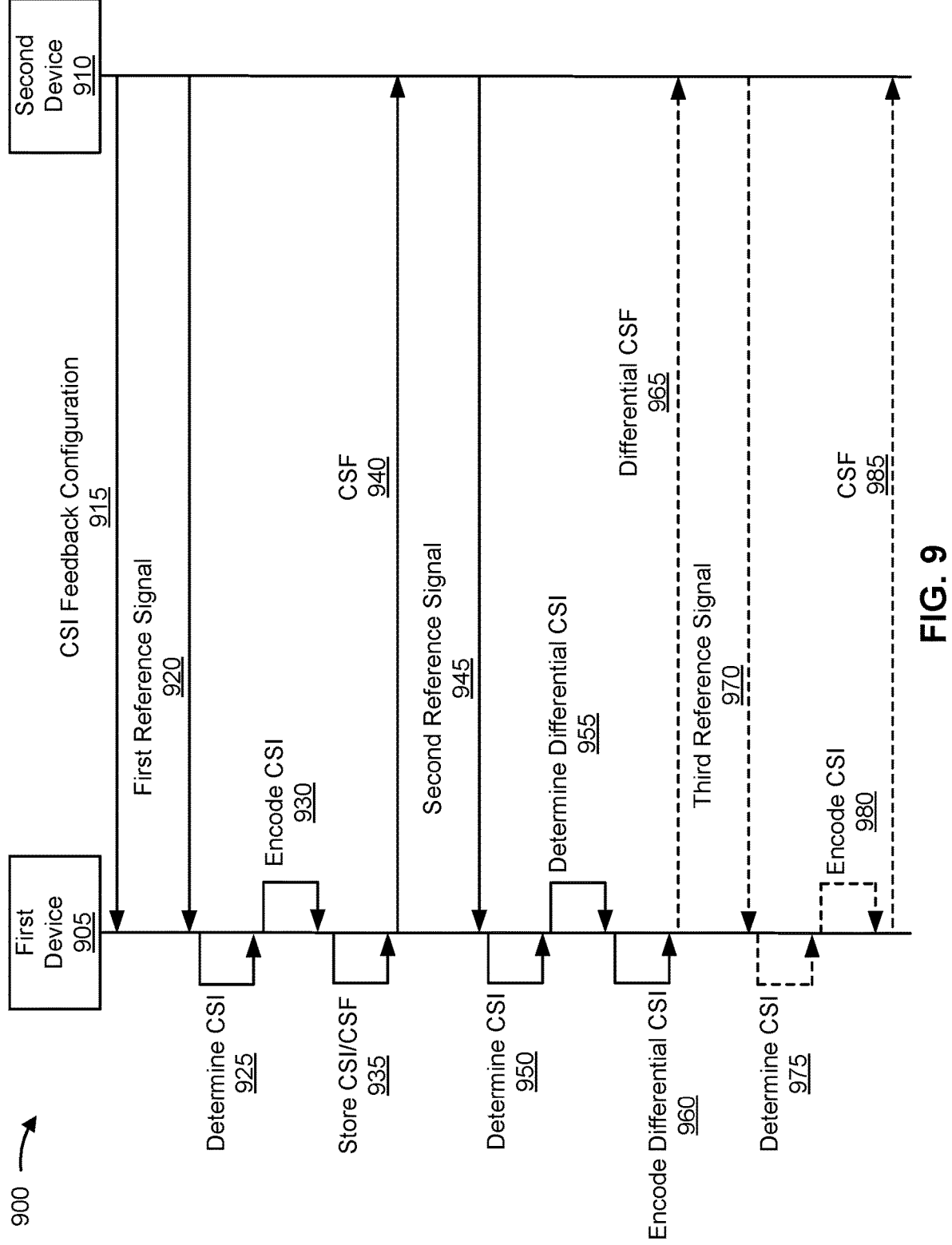
FIG. 9 is a diagram illustrating an example associated with configurations for providing channel state feedback (CSF) using a neural network, in accordance with the present disclosure.

FIG. 9 is a diagram illustrating an example associated with configuration of a first device (e.g., an encoding device), based on a first device capability, for encoding CSF using a neural network, in accordance with the present disclosure. As shown, a first device 905 and a second device 910 may communicate with one another. In some aspects, the first device 905 and the second device 910 may com-municate via a wireless communication network (e.g., wire-less network 100 shown in FIG. 1). The first device 905 may be an encoding device (e.g., UE 120, encoding device 300, and/or the like) and the second device 910 may be a decoding device (e.g., base station 110, decoding device 350, and/or the like).

As shown by reference number 915, the second device 910 may transmit, and the first device 905 may receive, a CSI feedback configuration that includes an indication to save, for a specified time period, a CSF that corresponds to a first reference signal carried on a downlink channel. In some aspects, the CSF may include channel information and interference information. In some aspects, the specified time period may include a number of slots or a number of milliseconds. In some aspects, the CSI feedback configura-tion may be carried in a radio resource control (RRC) message, a medium access control (MAC) control element (MAC-CE), and/or the like.

The CSI feedback configuration may indicate a differen-tial encoding scheme to use for encoding, based at least in part on the CSF, the differential CSF. In some aspects, the CSI feedback configuration may indicate a first neural network for encoding the CSF and a second neural network for encoding the differential CSF. In some aspects, the CSI feedback configuration may indicate a first power threshold for channel compression corresponding to the CSF and a second power threshold for channel compression corre-sponding to the differential CSF. The CSI feedback configu-ration may indicate a first number of delay taps to be used for channel compression corresponding to the CSF and a second number of delay taps to be used for channel com-pression corresponding to the differential CSF.

In some aspects, the CSI feedback configuration may indicate a first compression amount corresponding to the CSF and a second compression amount corresponding to the differential CSF. In some aspects, the CSI feedback con-figuration may indicate a first quantization type correspond-ing to the CSF and a second quantization type corresponding to the differential CSF. In some aspects, the CSI feedback configuration may indicate a first neural network training time corresponding to the CSF and a second neural network training time corresponding to the differential CSF.

In some aspects, the CSI feedback configuration may include an indication to report at least one neural network based CSI based at least in part on determining that a differential neural network based reporting threshold is satisfied. In some aspects, the CSI feedback configuration may include an indication to refrain from transmitting a second CSF for a specified time period after transmitting a first CSF that includes neural network based CSI.

As shown by reference number 920, the second device 910 may transmit, and the first device 905 may receive, a first reference signal. In some aspects, for example, the first reference signal may include a CSI-RS. As shown by reference number 925, the first device 905 may determine CSI corresponding to the first reference signal. As shown by reference number 930, the first device 905 may encode the CSI corresponding to the first reference signal to generate CSF. In some aspects, for example, the first device 905 may use a first neural network to generate the CSF.

As shown by reference number 935, the first device 905 may store the CSI and/or the CSF in a memory. As shown by reference number 940, the first device 905 may transmit, and the second device 910 may receive, the CSF. As shown by reference number 945, the second device 910 may transmit, and the first device 905 may receive, a second reference signal. In some aspects, for example, the second reference signal may include a CSI-RS. In accordance with the CSI feedback configuration, the first device 905 may refrain from transmitting CSF based on the second reference signal.

As shown by reference number 950, in some aspects, the first device 905 may determine CSI corresponding to the second reference signal and, as shown by reference number 955, may determine a differential CSI. The differential CSI may be based at least in part on the CSI corresponding to the first reference signal and the CSI corresponding to the second reference signal. In some aspects, the CSI corre-sponding to the first reference signal may have a first CSI type, and the CSI corresponding to the second reference signal may have a second CSI type. For example, the first CSI type may include a Type-I CSI, a Type-II CSI, or a Type-III CSI. The second CSI type may include a Type-I CSI, a Type-II CSI, or a differential neural network based CSI.

In some aspects, as shown by reference number 960, the first device 905 may encode the differential CSI to generate a differential CSF. The differential CSF may indicate, for example, a differential neural network based CSI. In some aspects, the first device 905 may encode the second CSI to generate a second CSF. The first device 905 may generate a differential CSF based at least in part on the second CSF and a stored first CSF. In some aspects, the first device 905 may use a first neural network to generate the first CSF and a second neural network to generate the differential CSF.

In some aspects, the first reference signal may include a first CSI-RS associated with a first set of antenna ports, and the second reference signal may include a second CSI-RS associated with a second set of antenna ports. In some aspects, the specified time period may include a time period during which the first set of antenna ports and the second set of antenna ports are quasi-co-located.

In some aspects, the CSI feedback configuration may include an indication that the first set of antenna ports and the second set of antenna ports are not quasi-co-located. The first device 905 may determine a number of bits for the differential CSF based at least in part on the indication that the first set of antenna ports and the second set of antenna ports are not quasi-co-located. In some aspects, the first device 905 may receive an indication of a number of bits for the differential CSF, wherein the number of bits for the differential CSF is based at least in part on a determination that the first set of antenna ports and the second set of antenna ports are not quasi co-located. For example, in some aspects, the second device 910 may transmit the indication of the number of bits to the first device 905. The indication of the number of bits may be carried in downlink control information (DCI), a MAC-CE, or a combination of DCI and a MAC-CE.

As shown by reference number 965, the first device 905 may transmit, and the second device 910 may receive, a differential CSF. The differential CSF may be based at least in part on the CSF and a second reference signal carried on the downlink channel, as explained above. In some aspects, as indicated by the dashed arrow associated with reference number 965, the first device 905 may refrain from transmitting a second CSF, a differential CSF, and/or the like. In some aspects, for example, the first device 905 may refrain from transmitting the second CSF and/or differential CSF based at least in part on the CSI feedback configuration.

In some aspects, as shown by reference number 970, the first device 905 may receive a third reference signal. The third reference signal may be received after a time period for which the first device 905 was to refrain from transmitting CSF. Accordingly, as shown by reference number 975, the first device 905 may determine CSI corresponding to the third reference signal. As shown by reference number 980, the first device 905 may encode the CSI corresponding to the third reference signal to generate a second CSF and, as shown by reference number 985, the first device 905 may transmit the CSF. In some aspects, for example, the second CSF may include Type-I CSI or Type-II CSI.

As indicated above, FIG. 9 is provided merely as an example. Other examples may differ from what is described with regard to FIG. 9.

Figure 10:
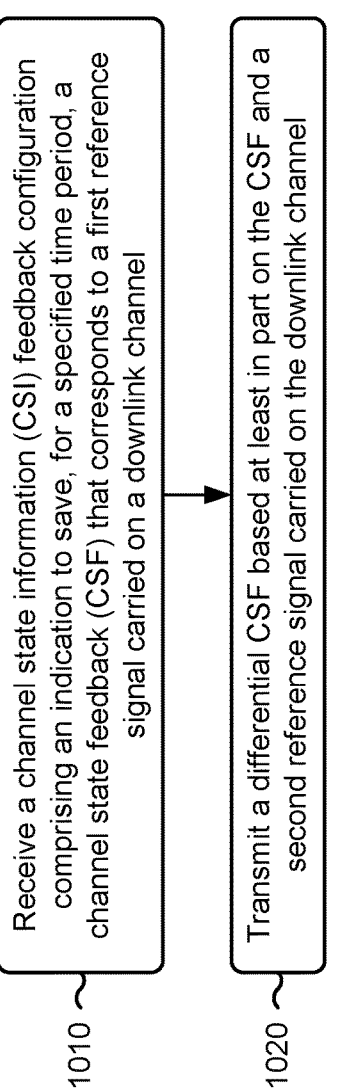

FIG. 10 is a diagram illustrating an example process 1000 performed, for example, by a first device, in accordance with the present disclosure. Example process 1000 is an example where the first device (e.g., first device 905 shown in FIG. 9) performs operations associated with configurations for channel state feedback.

As shown in FIG. 10, in some aspects, process 1000 may include receiving a CSI feedback configuration comprising an indication to save, for a specified time period, a CSF that corresponds to a first reference signal carried on a downlink channel (block 1010). For example, the first device (e.g., using reception component 1402 of FIG. 14) may receive a CSI feedback configuration comprising an indication to save, for a specified time period, a CSF that corresponds to a first reference signal carried on a downlink channel, as described above.

As further shown in FIG. 10, in some aspects, process 1000 may include transmitting a differential CSF based at least in part on the CSF and a second reference signal carried on the downlink channel (block 1020). For example, the first device (e.g., using transmission component 1406 of FIG. 14) may transmit a differential CSF based at least in part on the CSF and a second reference signal carried on the downlink channel, as described above.

Process 1000 may include additional aspects, such as any single aspect or any combination of aspects described below and/or in connection with one or more other processes described elsewhere herein.

In a first aspect, the CSI feedback configuration is carried in at least one of an RRC message, a MAC-CE, or a combination thereof.

In a second aspect, alone or in combination with the first aspect, the specified time period comprises a number of slots or a number of milliseconds.

In a third aspect, alone or in combination with one or more of the first and second aspects, the CSF comprises channel information and interference information.

In a fourth aspect, alone or in combination with one or more of the first through third aspects, the CSI feedback configuration indicates a differential encoding scheme to use for encoding, based at least in part on the CSF, the differential CSF.

In a fifth aspect, alone or in combination with one or more of the first through fourth aspects, process 1000 includes receiving the first reference signal; determining CSI corresponding to the first reference signal; encoding the CSI corresponding to the first reference signal using a first neural network to generate the CSF; and transmitting the CSF.

In a sixth aspect, alone or in combination with one or more of the first through fifth aspects, process 1000 includes receiving the second reference signal; determining CSI corresponding to the second reference signal; determining a differential CSI based at least in part on the CSI corresponding to the first reference signal and the CSI corresponding to the second reference signal; and encoding the differential CSI using a second neural network to generate the differential CSF.

In a seventh aspect, alone or in combination with one or more of the first through sixth aspects, the CSI corresponding to the first reference signal has a first CSI type and the CSI corresponding to the second reference signal has a second CSI type.

In an eighth aspect, alone or in combination with one or more of the first through seventh aspects, the first CSI type comprises Type-I CSI, Type-II CSI, or Type-III CSI, and the second CSI type comprises Type-I CSI, Type-II CSI, or differential neural network based CSI.

In a ninth aspect, alone or in combination with one or more of the first through eighth aspects, the CSI feedback configuration indicates a first neural network for encoding the CSF and a second neural network for encoding the differential CSF.

In a tenth aspect, alone or in combination with one or more of the first through ninth aspects, the CSI feedback configuration indicates a first power threshold for channel compression corresponding to the CSF and a second power threshold for channel compression corresponding to the differential CSF.

In an eleventh aspect, alone or in combination with one or more of the first through tenth aspects, the CSI feedback configuration indicates a first number of delay taps to be used for channel compression corresponding to the CSF and a second number of delay taps to be used for channel compression corresponding to the differential CSF.

In a twelfth aspect, alone or in combination with one or more of the first through eleventh aspects, the CSI feedback configuration indicates a first compression amount corresponding to the CSF and a second compression amount corresponding to the differential CSF.

In a thirteenth aspect, alone or in combination with one or more of the first through twelfth aspects, the CSI feedback configuration indicates a first quantization type corresponding to the CSF and a second quantization type corresponding to the differential CSF.

In a fourteenth aspect, alone or in combination with one or more of the first through thirteenth aspects, the CSI feedback configuration indicates a first neural network training time corresponding to the CSF and a second neural network training time corresponding to the differential CSF.

In a fifteenth aspect, alone or in combination with one or more of the first through fourteenth aspects, the differential CSF indicates a differential Type-III CSI.

In a sixteenth aspect, alone or in combination with one or more of the first through fifteenth aspects, the CSI feedback configuration comprises an indication to report at least one neural network based CSI based at least in part on determining that a differential neural network based reporting threshold is satisfied.

In a seventeenth aspect, alone or in combination with one or more of the first through sixteenth aspects, the first reference signal comprises a first CSI-RS associated with a first set of antenna ports, and the second reference signal comprises a second CSI-RS associated with a second set of antenna ports.

In an eighteenth aspect, alone or in combination with one or more of the first through seventeenth aspects, the specified time period comprises a time period during which the first set of antenna ports and the second set of antenna ports are quasi-co-located.

In a nineteenth aspect, alone or in combination with one or more of the first through eighteenth aspects, the CSI feedback configuration comprises an indication that the first set of antenna ports and the second set of antenna ports are not quasi-co-located.

In a twentieth aspect, alone or in combination with one or more of the first through nineteenth aspects, process 1000 includes determining a number of bits for the differential CSF based at least in part on the indication that the first set of antenna ports and the second set of antenna ports are not quasi-co-located.

In a twenty-first aspect, alone or in combination with one or more of the first through twentieth aspects, process 1000 includes receiving an indication of a number of bits for the differential CSF, where the number of bits for the differential CSF is based at least in part on a determination that the first set of antenna ports and the second set of antenna ports are not quasi co-located.

In a twenty-second aspect, alone or in combination with one or more of the first through twenty-first aspects, the indication of the number of bits is carried in at least one of DCI, a MAC-CE, or a combination of DCI and a MAC-CE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a first device, in accordance with the present disclosure. Example process 1100 is an example where the first device (e.g., first device 905 shown in FIG. 9) performs operations associated with configurations for channel state feedback.

As shown in FIG. 11, in some aspects, process 1100 may include receiving a CSI feedback configuration comprising an indication to refrain from transmitting a second CSF for a specified time period after transmitting a first CSF that includes neural network based CSI (block 1110). For example, the first device (e.g., using reception component 1402 of FIG. 14) may receive a CSI feedback configuration comprising an indication to refrain from transmitting a second CSF for a specified time period after transmitting a first CSF that includes neural network based CSI, as described above.

As further shown in FIG. 11, in some aspects, process 1100 may include transmitting the first CSF (block 1120). For example, the first device (e.g., using transmission component 1406 of FIG. 14) may transmit the first CSF, as described above.

As further shown in FIG. 11, in some aspects, process 1100 may include refraining from transmitting the second CSF based at least in part on the CSI feedback configuration (block 1130). For example, the first device (e.g., using communication manager 1404) may refrain from transmitting the second CSF based at least in part on the CSI feedback configuration, as described above.

Process 1100 may include additional aspects, such as any single aspect or any combination of aspects described below and/or in connection with one or more other processes described elsewhere herein.

In a first aspect, the second CSF comprises Type-I CSI or Type-II CSI.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
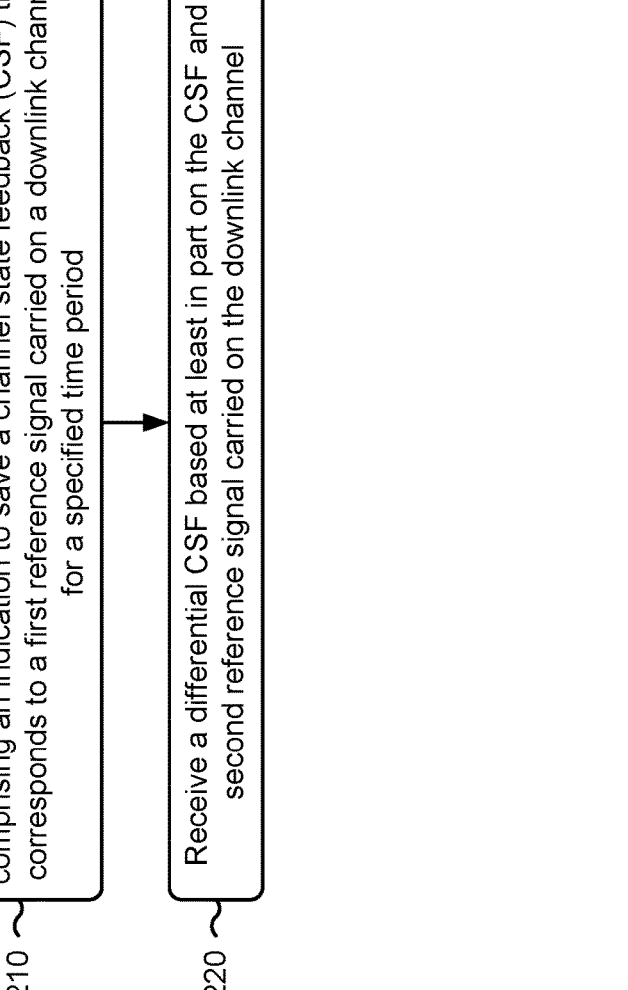

FIG. 12 is a diagram illustrating an example process 1200 performed, for example, by a second device, in accordance with the present disclosure. Example process 1200 is an example where the second device (e.g., second device 910 shown in FIG. 9) performs operations associated with configurations for channel state feedback.

As shown in FIG. 12, in some aspects, process 1200 may include transmitting a CSI feedback configuration comprising an indication to save a CSF that corresponds to a first reference signal carried on a downlink channel for a specified time period (block 1210). For example, the second device (e.g., using transmission component 1606 of FIG. 16) may transmit a CSI feedback configuration comprising an indication to save a CSF that corresponds to a first reference signal carried on a downlink channel for a specified time period, as described above.

As further shown in FIG. 12, in some aspects, process 1200 may include receiving a differential CSF based at least in part on the CSF and a second reference signal carried on the downlink channel (block 1220). For example, the second device (e.g., using reception component 1602 of FIG. 16) may receive a differential CSF based at least in part on the CSF and a second reference signal carried on the downlink channel, as described above.

Process 1200 may include additional aspects, such as any single aspect or any combination of aspects described below and/or in connection with one or more other processes described elsewhere herein.

In a first aspect, the CSI feedback configuration is carried in at least one of an RRC message, a MAC-CE, or a combination thereof.

In a second aspect, alone or in combination with the first aspect, the specified time period comprises a number of slots or a number of milliseconds.

In a third aspect, alone or in combination with one or more of the first and second aspects, the CSF comprises channel information and interference information.

In a fourth aspect, alone or in combination with one or more of the first through third aspects, the CSI feedback configuration indicates a differential encoding scheme to be used for encoding, based at least in part on the CSF, the differential CSF.

In a fifth aspect, alone or in combination with one or more of the first through fourth aspects, process 1200 includes transmitting the first reference signal and receiving the CSF.

In a sixth aspect, alone or in combination with one or more of the first through fifth aspects, process 1200 includes transmitting the second reference signal.

In a seventh aspect, alone or in combination with one or more of the first through sixth aspects, the CSI feedback configuration includes an indication of a first neural network, an indication to determine CSI corresponding to the first reference signal, and an indication to encode the CSI corresponding to the first reference signal using a first neural network to generate the CSF.

In an eighth aspect, alone or in combination with one or more of the first through seventh aspects, the CSI feedback configuration includes an indication of a second neural network, an indication to determine CSI corresponding to the second reference signal, an indication to determine a differential CSI based at least in part on the CSI corresponding to the first reference signal and the CSI corresponding to the second reference signal, and an indication to encode the differential CSI using a second neural network to generate the differential CSF.

In a ninth aspect, alone or in combination with one or more of the first through eighth aspects, the CSI corresponding to the first reference signal has a first CSI type and the CSI corresponding to the second reference signal has a second CSI type.

In a tenth aspect, alone or in combination with one or more of the first through ninth aspects, the first CSI type comprises Type-I CSI, Type-II CSI, or Type-III CSI, and the second CSI type comprises Type-I CSI, Type-II CSI, or differential neural network based CSI.

In an eleventh aspect, alone or in combination with one or more of the first through tenth aspects, the CSI feedback configuration indicates a first power threshold for channel compression corresponding to the CSF and a second power threshold for channel compression corresponding to the differential CSF.

In a twelfth aspect, alone or in combination with one or more of the first through eleventh aspects, the CSI feedback configuration indicates a first number of delay taps to be used for channel compression corresponding to the CSF and a second number of delay taps to be used for channel compression corresponding to the differential CSF.

In a thirteenth aspect, alone or in combination with one or more of the first through twelfth aspects, the CSI feedback configuration indicates a first compression amount corresponding to the CSF and a second compression amount corresponding to the differential CSF.

In a fourteenth aspect, alone or in combination with one or more of the first through thirteenth aspects, the CSI feedback configuration indicates a first quantization type corresponding to the CSF and a second quantization type corresponding to the differential CSF.

In a fifteenth aspect, alone or in combination with one or more of the first through fourteenth aspects, the CSI feedback configuration indicates a first neural network training time corresponding to the CSF and a second neural network training time corresponding to the differential CSF.

In a sixteenth aspect, alone or in combination with one or more of the first through fifteenth aspects, the differential CSF indicates a differential Type-III CSI.

In a seventeenth aspect, alone or in combination with one or more of the first through sixteenth aspects, the CSI feedback configuration comprises an indication to report at least one neural network based CSI based at least in part on determining that a differential neural network based reporting threshold is satisfied.

In an eighteenth aspect, alone or in combination with one or more of the first through seventeenth aspects, the first reference signal comprises a first CSI-RS associated with a first set of antenna ports, and the second reference signal comprises a second CSI-RS associated with a second set of antenna ports.

In a nineteenth aspect, alone or in combination with one or more of the first through eighteenth aspects, the specified time period comprises a time period during which the first set of antenna ports and the second set of antenna ports are quasi-co-located.

In a twentieth aspect, alone or in combination with one or more of the first through nineteenth aspects, the CSI feedback configuration comprises an indication that the first set of antenna ports and the second set of antenna ports are not quasi-co-located.

In a twenty-first aspect, alone or in combination with one or more of the first through twentieth aspects, process 1200 includes determining that the first set of antenna ports and the second set of antenna ports are not quasi co-located, determining a number of bits for the differential CSF based at least in part on determining that the first set of antenna ports and the second set of antenna ports are not quasi co-located, and transmitting an indication of the number of bits for the differential CSF.

In a twenty-second aspect, alone or in combination with one or more of the first through twenty-first aspects, the indication of the number of bits is carried in at least one of DCI, a MAC-CE, or a combination of DCI and a MAC-CE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
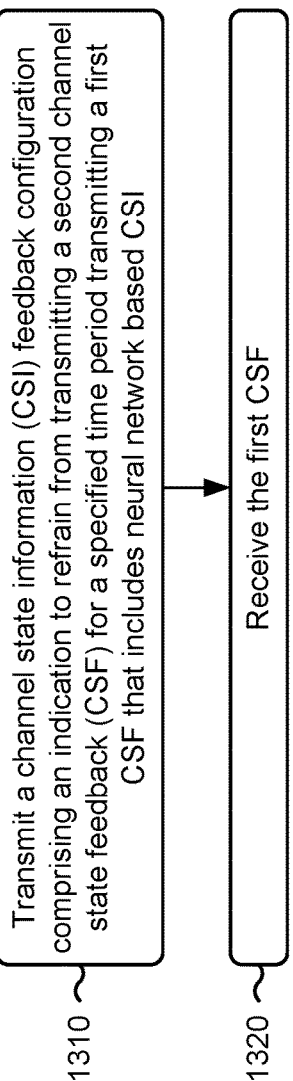

FIG. 13 is a diagram illustrating an example process 1300 performed, for example, by a second device, in accordance with the present disclosure. Example process 1300 is an example where the second device (e.g., second device 910 shown in FIG. 9) performs operations associated with con-figurations for CSF.

As shown in FIG. 13, in some aspects, process 1300 may include transmitting a CSI feedback configuration compris-ing an indication to refrain from transmitting a second CSF for a specified time period after transmitting a first CSF that includes neural network based CSI (block 1310). For example, the second device (e.g., using transmission component 1606 of FIG. 16) may transmit a CSI feedback configuration comprising an indication to refrain from transmitting a second CSF for a specified time period after transmitting a first CSF that includes neural network based CSI, as described above.

As further shown in FIG. 13, in some aspects, process 1300 may include receiving the first CSF (block 1320). For example, the second device (e.g., using reception component 1602) may receive the first CSF, as described above.

Process 1300 may include additional aspects, such as any single aspect or any combination of aspects described below and/or in connection with one or more other processes described elsewhere herein.

In a first aspect, the second CSF comprises Type-I CSI or Type-II CSI.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
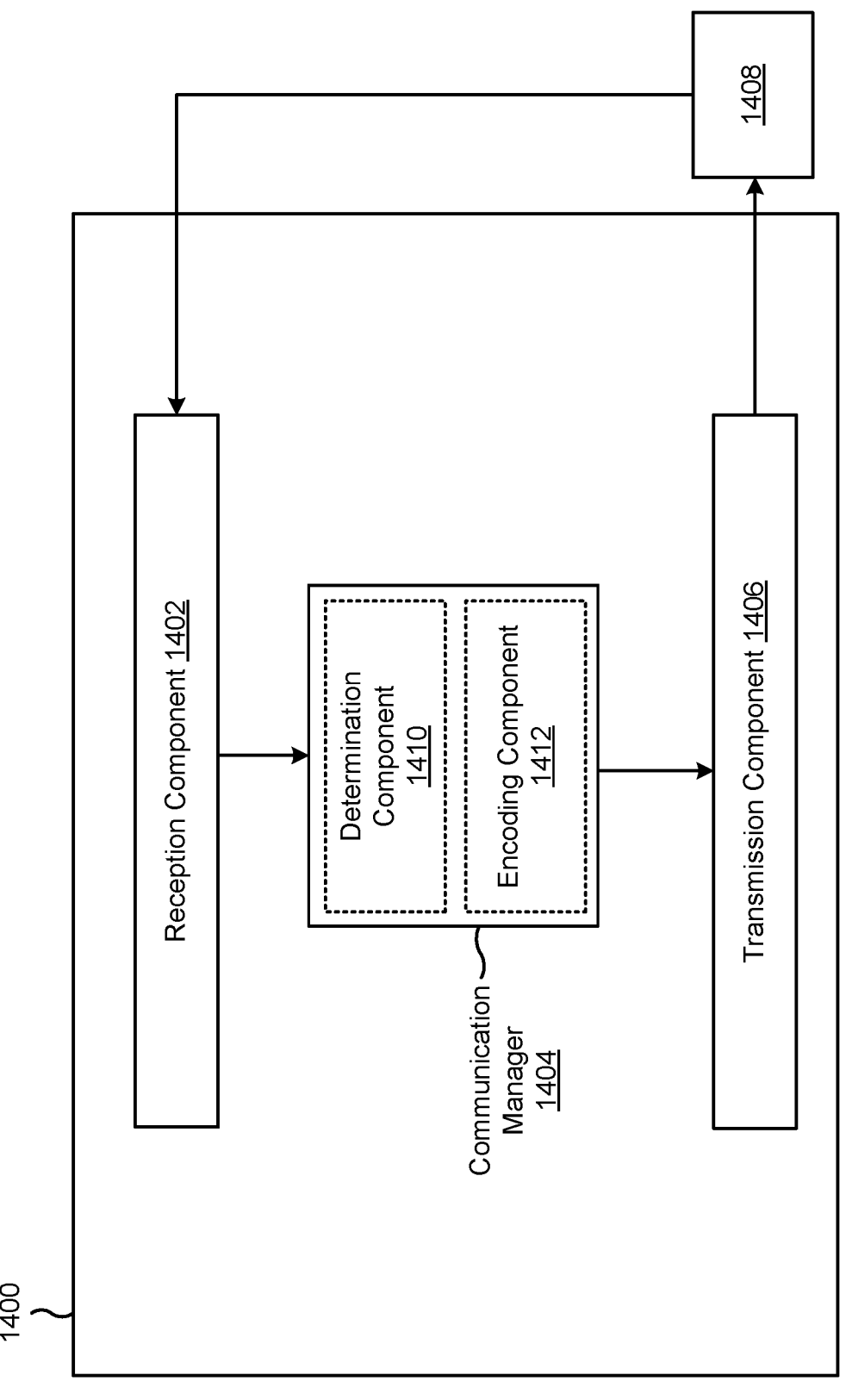
FIGS. 14 and 15 are examples of apparatuses for wireless communication in accordance with the present disclosure.

FIG. 14 is a block diagram of an example apparatus 1400 for wireless communication in accordance with the present disclosure. The apparatus 1400 may be a first device (e.g., an encoding device), or a first device may include the apparatus 1400. In some aspects, the apparatus 1400 includes a reception component 1402, a communication manager 1404, and a transmission component 1406, which may be in communication with one another (for example, via one or more buses). As shown, the apparatus 1400 may communicate with another apparatus 1408 (such as a decoding device, a base station, an encoding device, or another wireless communication device) using the reception component 1402 and the transmission component 1406.

In some aspects, the apparatus 1400 may be configured to perform one or more operations described herein in connection with FIGS. 3-9. Additionally or alternatively, the apparatus 1400 may be configured to perform one or more processes described herein, such as process 1000 of FIG. 10, 1100 of FIG. 11, or a combination thereof. In some aspects, the apparatus 1400 may include one or more components of the UE 120 described above in connection with FIG. 2.

The reception component 1402 may provide means for receiving communications, such as reference signals, control information, data communications, or a combination thereof, from the apparatus 1408. The reception component 1402 may provide received communications to one or more other components of the apparatus 1400, such as the communication manager 1404. In some aspects, the reception component 1402 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a demodulator, a MIMO detector, a receive processor, a controller/processor, a memory, or a combination thereof, of the first UE described above in connection with FIG. 2.

The transmission component 1406 may provide means for transmitting communications, such as reference signals, control information, data communications, or a combination thereof, to the apparatus 1408. In some aspects, the communication manager 1404 may generate communications and may transmit the generated communications to the transmission component 1406 for transmission to the apparatus 1408. In some aspects, the transmission component 1406 may provide means for performing signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1406 may include one or more antennas, a modulator, a transmit MIMO processor, a transmit processor, a controller/processor, a memory, or a combination thereof, of the first UE described above in connection with FIG. 2. In some aspects, the transmission component 1406 may be co-located with the reception component 1402 in a transceiver.

In some aspects, the communication manager 1404 may provide means for receiving a channel state information (CSI) feedback configuration comprising an indication to save, for a specified time period, a channel state feedback (CSF) that corresponds to a first reference signal carried on a downlink channel, means for transmitting a differential CSF based at least in part on the CSF and a second reference signal carried on the downlink channel, and/or the like. In some aspects, the communication manager 1404 may provide means for receiving a CSI feedback configuration comprising an indication to refrain from transmitting a second CSF for a specified time period after transmitting a first CSF that includes neural network based CSI, means for transmitting the first CSF, means for refraining from transmitting the second CSF based at least in part on the CSI feedback configuration, and/or the like. In some aspects, the communication manager 1404 may include means for processing and/or implementing a CSF neural network configuration received by the reception component 1402. In some aspects, the communication manager 1404 may include a controller/processor, a memory, or a combination thereof, of the first UE described above in connection with FIG. 2.

In some aspects, the communication manager 1404 may include a set of components, such as a determination component 1410, an encoding component 1412, or a combination thereof. Alternatively, the set of components may be separate and distinct from the communication manager 1404. In some aspects, the determination component 1410 may include means for determining means for determining CSI, means for determining differential CSI, means for determining a number of bits for the differential CSF based at least in part on the indication that the first set of antenna ports and the second set of antenna ports are not quasi-collocated, and/or the like. In some aspects, the encoding component 1412 may include means for implementing one or more neural networks for encoding a data set such as, for example, CSI or differential CSI to generate, respectively, CSF or differential CSF.

In some aspects, the communication manager 1404 and/or one or more components of the set of components may include or may be implemented within hardware (e.g., one or more of the circuitry described in connection with FIG. 18). In some aspects, the communication manager 1404 and/or one or more components of the set of components may include or may be implemented within a controller/processor, a memory, or a combination thereof, of the UE 120 described above in connection with FIG. 2.

In some aspects, the communication manager 1404 and/or one or more components of the set of components may be implemented in code (e.g., as software or firmware stored in a memory), such as the code described in connection with FIG. 18. For example, the communication manager 1404 and/or a component (or a portion of a component) may be implemented as instructions or code stored in a non-transitory computer-readable medium and executable by a controller or a processor to perform the functions or operations of the communication manager 1404 and/or the component. If implemented in code, the functions of the communication manager 1404 and/or a component may be executed by a controller/processor, a memory, a scheduler, a communication unit, or a combination thereof, of the UE 120 described above in connection with FIG. 2.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
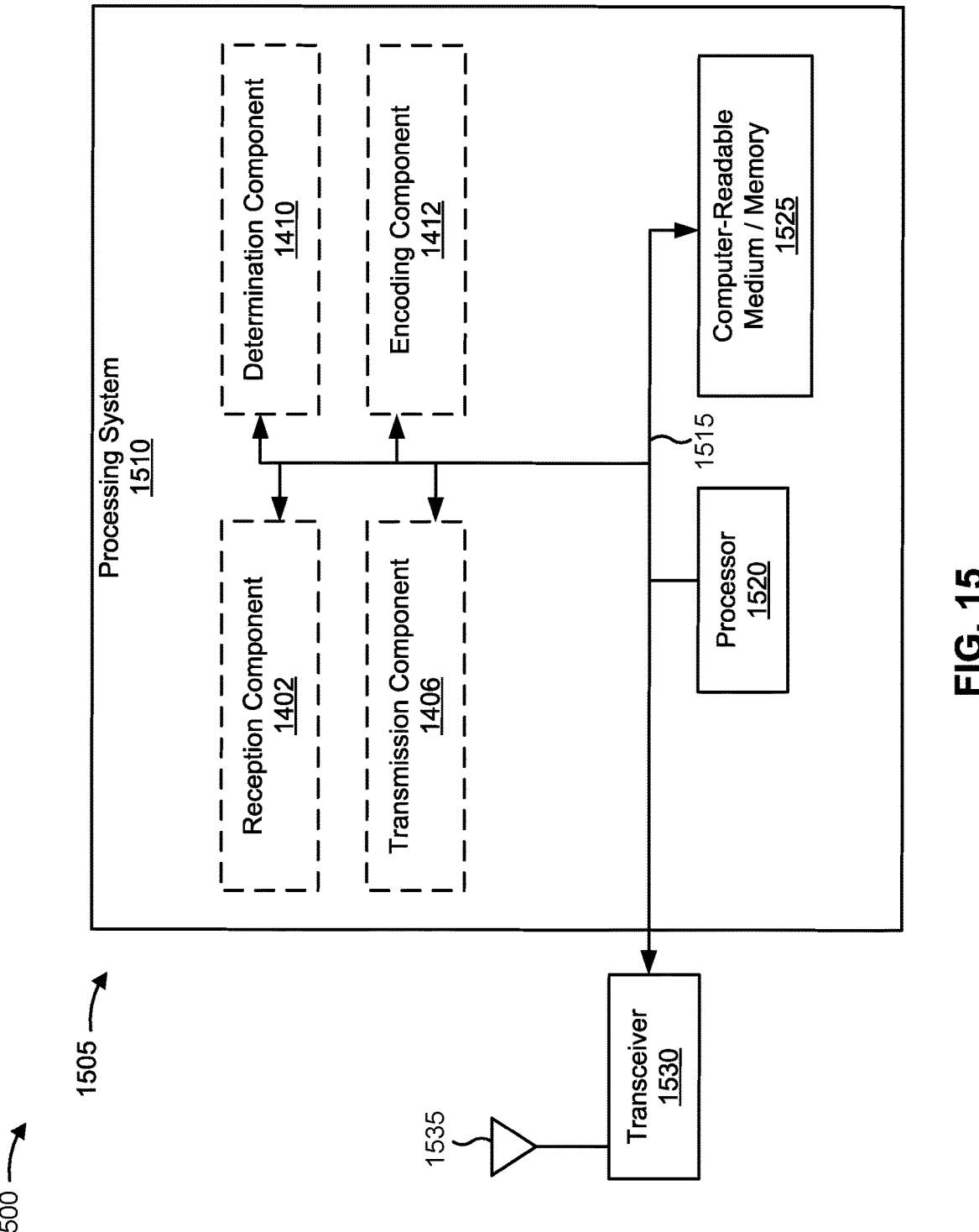

FIG. 15 is a diagram illustrating an example 1500 of a hardware implementation for an apparatus 1505 employing a processing system 1510. The apparatus 1505 may be a first device (e.g., the apparatus 1400 shown in FIG. 14, the first device 905 shown in FIG. 9, and/or the like).

The processing system 1510 may be implemented with a bus architecture, represented generally by the bus 1515. The bus 1515 may include any number of interconnecting buses and bridges depending on the specific application of the processing system 1510 and the overall design constraints. The bus 1515 links together various circuits including one or more processors and/or hardware components, represented by the processor 1520, the illustrated components, and the computer-readable medium/memory 1525. The bus 1515 may also link various other circuits, such as timing sources, peripherals, voltage regulators, power management circuits, and/or the like.

The processing system 1510 may be coupled to a transceiver 1530. The transceiver 1530 is coupled to one or more antennas 1535. The transceiver 1530 provides a means for communicating with various other apparatuses over a transmission medium. The transceiver 1530 receives a signal from the one or more antennas 1535, extracts information from the received signal, and provides the extracted information to the processing system 1510, specifically the reception component 1402. In addition, the transceiver 1530 receives information from the processing system 1510, specifically the transmission component 1406, and generates a signal to be applied to the one or more antennas 1535 based at least in part on the received information.

The processing system 1510 includes a processor 1520 coupled to a computer-readable medium/memory 1525. The processor 1520 is responsible for general processing, including the execution of software stored on the computer-readable medium/memory 1525. The software, when executed by the processor 1520, causes the processing system 1510 to perform the various functions described herein for any particular apparatus. The computer-readable medium/memory 1525 may also be used for storing data that is manipulated by the processor 1520 when executing software. The processing system further includes at least one of the illustrated components. For example, the processing system may include the determination component 1410, the encoding component 1412, and/or the like. The components may be software modules running in the processor 1520, resident/stored in the computer readable medium/memory

1525, one or more hardware modules coupled to the processor 1520, or some combination thereof.

In some aspects, the processing system 1510 may be a component of the UE 120 and may include the memory 282 and/or at least one of the TX MIMO processor 266, the RX processor 258, and/or the controller/processor 280. In some aspects, the apparatus 1505 for wireless communication provides receiving a channel state information (CSI) feedback configuration comprising an indication to save, for a specified time period, a channel state feedback (CSF) that corresponds to a first reference signal carried on a downlink channel. In some aspects, the apparatus 1505 for wireless communication may provide means for transmitting a differential CSF based at least in part on the CSF and a second reference signal carried on the downlink channel. In some aspects, the apparatus 1505 for wireless communication provides means for receiving a channel state information (CSI) feedback configuration comprising an indication to refrain from transmitting a second channel state feedback (CSF) for a specified time period after transmitting a first CSF that includes neural network based CSI. In some aspects, the apparatus 1505 for wireless communication may provide means for transmitting the first CSF. In some aspects, the apparatus 1505 for wireless communications may provide means for refraining from transmitting the second CSF based at least in part on the CSI feedback configuration. The aforementioned means may be one or more of the aforementioned components of the apparatus 1400 and/or the processing system 1510 of the apparatus 1505 configured to perform the functions recited by the aforementioned means. As described elsewhere herein, the processing system 1510 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 15 is provided as an example. Other examples may differ from what is described in connection with FIG. 15.

Figure 16:
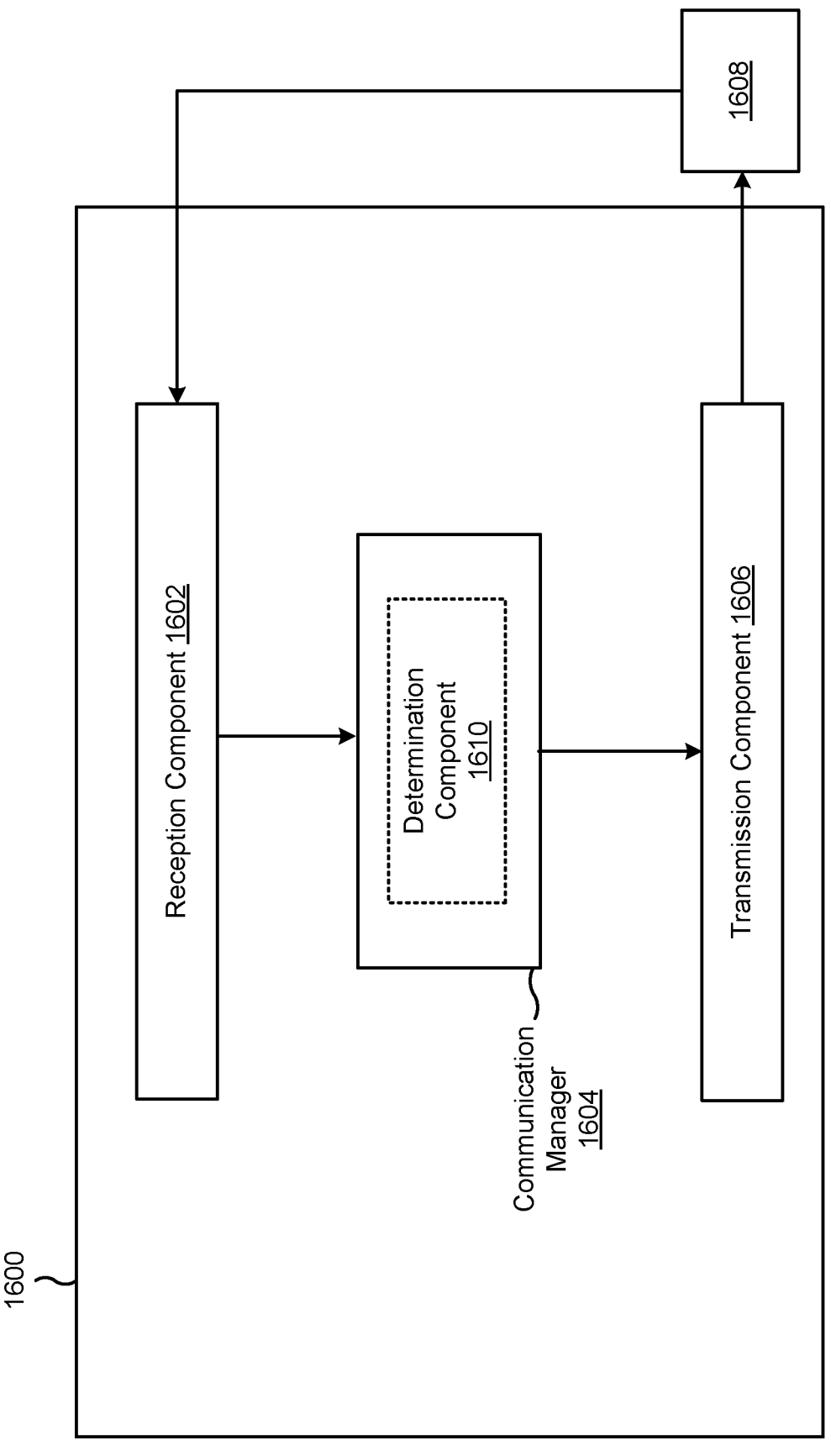
FIGS. 16 and 17 are diagrams illustrating examples of a hardware implementation for an apparatus employing a processing system.

FIG. 16 is a block diagram of an example apparatus 1600 for wireless communication in accordance with the present disclosure. The apparatus 1600 may be a second device (e.g., the second device 910 shown in FIG. 9, the decoding device 350 shown in FIG. 3, the base station 110 shown in FIG. 1, and/or the like), or a second device may include the apparatus 1600. In some aspects, the apparatus 1600 includes a reception component 1602, a communication manager 1604, and a transmission component 1606, which may be in communication with one another (for example, via one or more buses). As shown, the apparatus 1600 may communicate with another apparatus 1608 (such as a first device, a UE, a base station, or another wireless communication device) using the reception component 1602 and the transmission component 1606.

In some aspects, the apparatus 1600 may be configured to perform one or more operations described herein in connection with FIGS. 3-9. Additionally or alternatively, the apparatus 1600 may be configured to perform one or more processes described herein, such as process 1200 of FIG. 12, process 1300 of FIG. 13, or a combination thereof. In some aspects, the apparatus 1600 may include one or more components of the base station described above in connection with FIG. 2.

The reception component 1602 may provide means for receiving communications, such as reference signals, control information, data communications, or a combination thereof, from the apparatus 1608. The reception component 1602 may provide received communications to one or more other components of the apparatus 1600, such as the communication manager 1604. In some aspects, the reception component 1602 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a demodulator, a MIMO detector, a receive processor, a controller/processor, a memory, or a combination thereof, of the base station described above in connection with FIG. 2.

The transmission component 1606 may provide means for transmitting communications, such as reference signals, control information, data communications, or a combination thereof, to the apparatus 1608. In some aspects, the communication manager 1604 may generate communications and may transmit the generated communications to the transmission component 1606 for transmission to the apparatus 1608. In some aspects, the transmission component 1606 may provide means for performing signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1606 may include one or more antennas, a modulator, a transmit MIMO processor, a transmit processor, a controller/processor, a memory, or a combination thereof, of the base station described above in connection with FIG. 2. In some aspects, the transmission component 1606 may be co-located with the reception component 1602 in a transceiver.

The communication manager 1604 may provide means for transmitting a channel state information (CSI) feedback configuration comprising an indication to save a channel state feedback (CSF) that corresponds to a first reference signal carried on a downlink channel for a specified time period. The communication manager 1604 may provide means for receiving a differential CSF based at least in part on the CSF and a second reference signal carried on the downlink channel. In some aspects, the communication manager 1604 may include a controller/processor, a memory, a scheduler, a communication unit, or a combination thereof, of the base station described above in connection with FIG. 2.

In some aspects, the communication manager 1604 may include a set of components, such as a determination component 1610. Alternatively, the set of components may be separate and distinct from the communication manager 1604. In some aspects, the determination component 1610 may provide means for determining that the first set of antenna ports and the second set of antenna ports are not quasi co-located, means for determining a number of bits for the differential CSF based at least in part on determining that the first set of antenna ports and the second set of antenna ports are not quasi co-located, and/or the like.

In some aspects, the communication manager 1604 and/or one or more components of the set of components may include or may be implemented within hardware (e.g., one or more of the circuitry described in connection with FIG. 19). In some aspects, the communication manager 1604 and/or one or more components of the set of components may include or may be implemented within a controller/ processor, a memory, or a combination thereof, of the BS 110 described above in connection with FIG. 2.

In some aspects, the communication manager 1604 and/or one or more components of the set of components may be implemented in code (e.g., as software or firmware stored in a memory), such as the code described in connection with FIG. 19. For example, the communication manager 1604 and/or a component (or a portion of a component) may be implemented as instructions or code stored in a non-transitory computer-readable medium and executable by a controller or a processor to perform the functions or operations of the communication manager 1604 and/or the component. If implemented in code, the functions of the communication manager 1604 and/or a component may be executed by a controller/processor, a memory, a scheduler, a communication unit, or a combination thereof, of the BS 110 described above in connection with FIG. 2.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
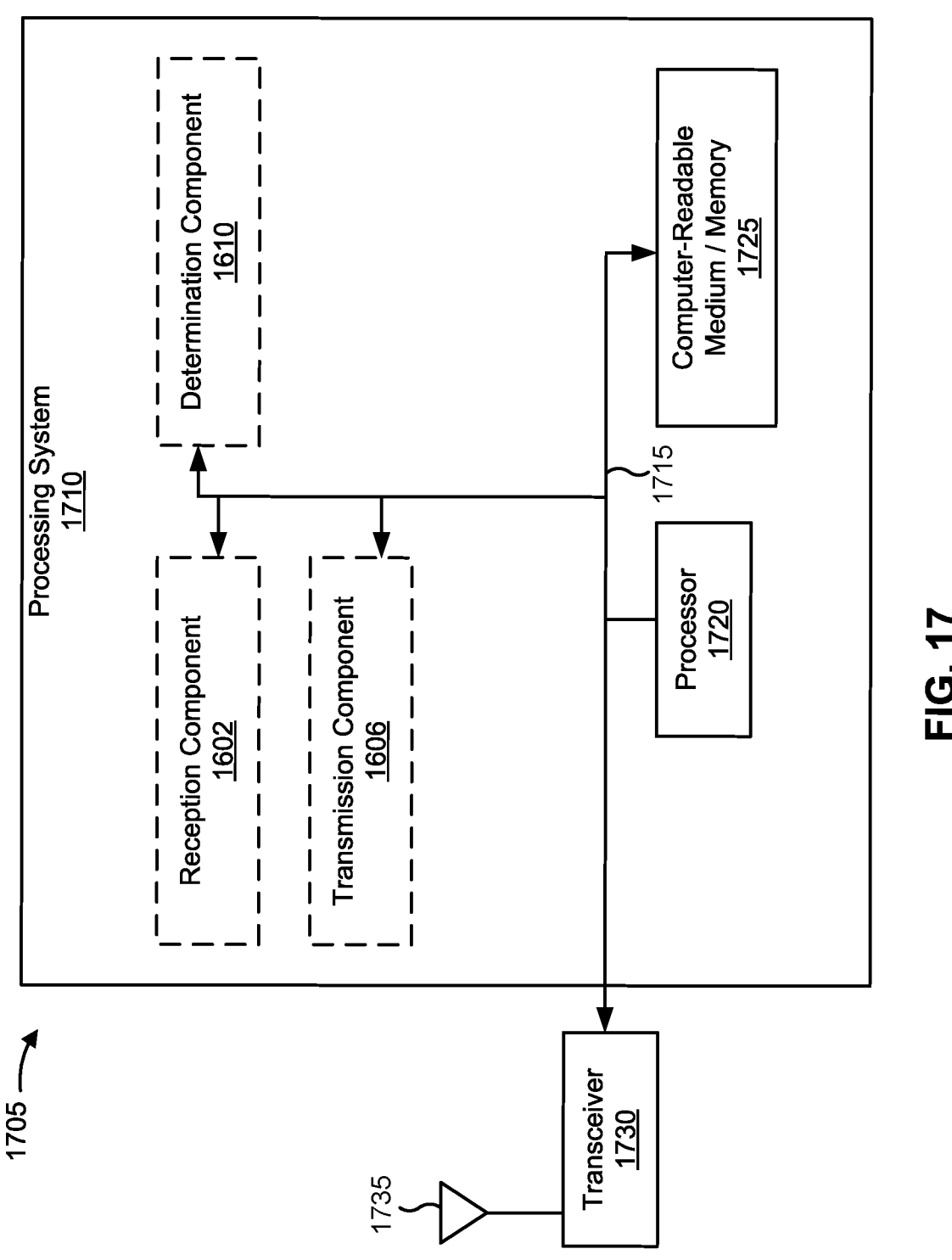

FIG. 17 is a diagram illustrating an example 1700 of a hardware implementation for an apparatus 1705 employing a processing system 1710. The apparatus 1705 may be a base station.

The processing system 1710 may be implemented with a bus architecture, represented generally by the bus 1715. The bus 1715 may include any number of interconnecting buses and bridges depending on the specific application of the processing system 1710 and the overall design constraints. The bus 1715 links together various circuits including one or more processors and/or hardware components, represented by the processor 1720, the illustrated components, and the computer-readable medium/memory 1725. The bus 1715 may also link various other circuits, such as timing sources, peripherals, voltage regulators, power management circuits, and/or the like.

The processing system 1710 may be coupled to a transceiver 1730. The transceiver 1730 is coupled to one or more antennas 1735. The transceiver 1730 provides a means for communicating with various other apparatuses over a transmission medium. The transceiver 1730 receives a signal from the one or more antennas 1735, extracts information from the received signal, and provides the extracted information to the processing system 1710, specifically the reception component 1602. In addition, the transceiver 1730 receives information from the processing system 1710, specifically the transmission component 1606, and generates a signal to be applied to the one or more antennas 1735 based at least in part on the received information.

The processing system 1710 includes a processor 1720 coupled to a computer-readable medium/memory 1725. The processor 1720 is responsible for general processing, including the execution of software stored on the computer-readable medium/memory 1725. The software, when executed by the processor 1720, causes the processing system 1710 to perform the various functions described herein for any particular apparatus. The computer-readable medium/memory 1725 may also be used for storing data that is manipulated by the processor 1720 when executing software. The processing system further includes at least one of the illustrated components. For example, the processing system may include the determination component 1610. The components may be software modules running in the processor 1720, resident/stored in the computer readable medium/memory 1725, one or more hardware modules coupled to the processor 1720, or some combination thereof.

In some aspects, the processing system 1710 may be a component of the base station 110 and may include the memory 242 and/or at least one of the TX MIMO processor 230, the RX processor 238, and/or the controller/processor 240. In some aspects, the apparatus 1705 for wireless communication includes means for transmitting a channel state information (CSI) feedback configuration comprising an indication to save a channel state feedback (CSF) that corresponds to a first reference signal carried on a downlink channel for a specified time period. The apparatus 1705 for wireless communication may include means receiving a differential CSF based at least in part on the CSF and a second reference signal carried on the downlink channel. The apparatus 1705 for wireless communication may include means for transmitting a channel state information (CSI) feedback configuration comprising an indication to refrain from transmitting a second channel state feedback (CSF) for a specified time period after transmitting a first CSF that includes neural network based CSI, means for receiving the first CSF, and/or the like. The aforementioned means may be one or more of the aforementioned components of the apparatus 1600 and/or the processing system 1710 of the apparatus 1705 configured to perform the functions recited by the aforementioned means. As described elsewhere herein, the processing system 1710 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 17 is provided as an example. Other examples may differ from what is described in connection with FIG. 17.

Figure 18:
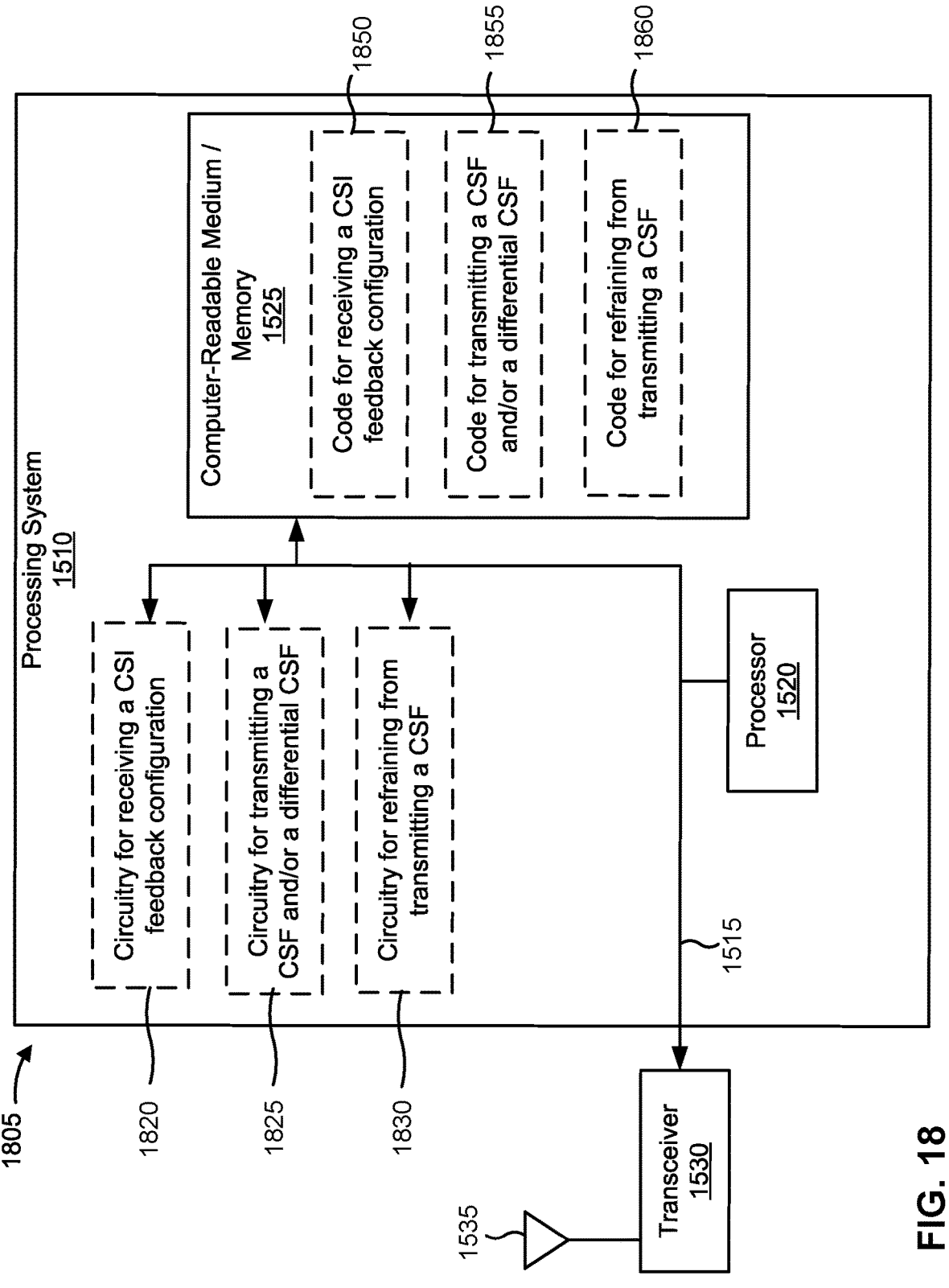
FIGS. 18 and 19 are diagrams illustrating examples of implementations of code and circuitry for an apparatus.

FIG. 18 is a diagram illustrating an example of an implementation of code and circuitry for an apparatus 1805. The apparatus 1805 may be a first device (e.g., an encoding device, a UE, and/or the like).

As further shown in FIG. 18, the apparatus 1805 may include circuitry for receiving a CSI feedback configuration (circuitry 1820). For example, the apparatus 1805 may include circuitry to enable the apparatus 1805 to receive a CSI feedback configuration comprising an indication to save, for a specified time period, a CSF that corresponds to a first reference signal carried on a downlink channel. In some aspects, the apparatus 1805 may include circuitry to enable the apparatus to receive a CSI feedback configuration comprising an indication to refrain from transmitting a second CSF for a specified time period after transmitting a first CSF that includes neural network based CSI.

As further shown in FIG. 18, the apparatus 1805 may include circuitry for transmitting a CSF and/or a differential CSF (circuitry 1825). For example, the apparatus 1805 may include circuitry to transmit a differential CSF based at least in part on the CSF and a second reference signal carried on the downlink channel. In some aspects, the apparatus 1805 may include circuitry to transmit a first CSF.

As further shown in FIG. 18, the apparatus 1805 may include circuitry for refraining from transmitting a CSF (circuitry 1830). For example, the apparatus 1805 may include circuitry to refrain from transmitting the second CSF based at least in part on the CSI feedback configuration.

As further shown in FIG. 18, the apparatus 1805 may include, stored in computer-readable medium 1525, code for receiving a CSI feedback configuration (code 1850). For example, the apparatus 1805 may include code that, when executed by the processor 1520, may cause the processor 1520 to receive a CSI feedback configuration comprising an indication to save, for a specified time period, a CSF that corresponds to a first reference signal carried on a downlink channel. In some aspects, the apparatus 1805 may include code that, when executed by the processor 1520, may cause the processor 1520 to receive a CSI feedback configuration comprising an indication to refrain from transmitting a second CSF for a specified time period after transmitting a first CSF that includes neural network based CSI.

As further shown in FIG. 18, the apparatus 1805 may include, stored in computer-readable medium 1525, code for transmitting a CSF and/or a differential CSF (code 1855). For example, the apparatus 1805 may include code that, when executed by the processor 1525, may cause the transceiver 1530 to transmit a differential CSF based at least in part on the CSF and a second reference signal carried on the downlink channel.

As further shown in FIG. 18, the apparatus 1805 may include, stored in computer-readable medium 1525, code for refraining from transmitting a CSF (code 1860). For example, the apparatus 1805 may include code that, when executed by the processor 1520, may cause the processor 1520 to refrain from transmitting the second CSF based at least in part on the CSI feedback configuration.

FIG. 18 is provided as an example. Other examples may differ from what is described in connection with FIG. 18.

Figure 19:
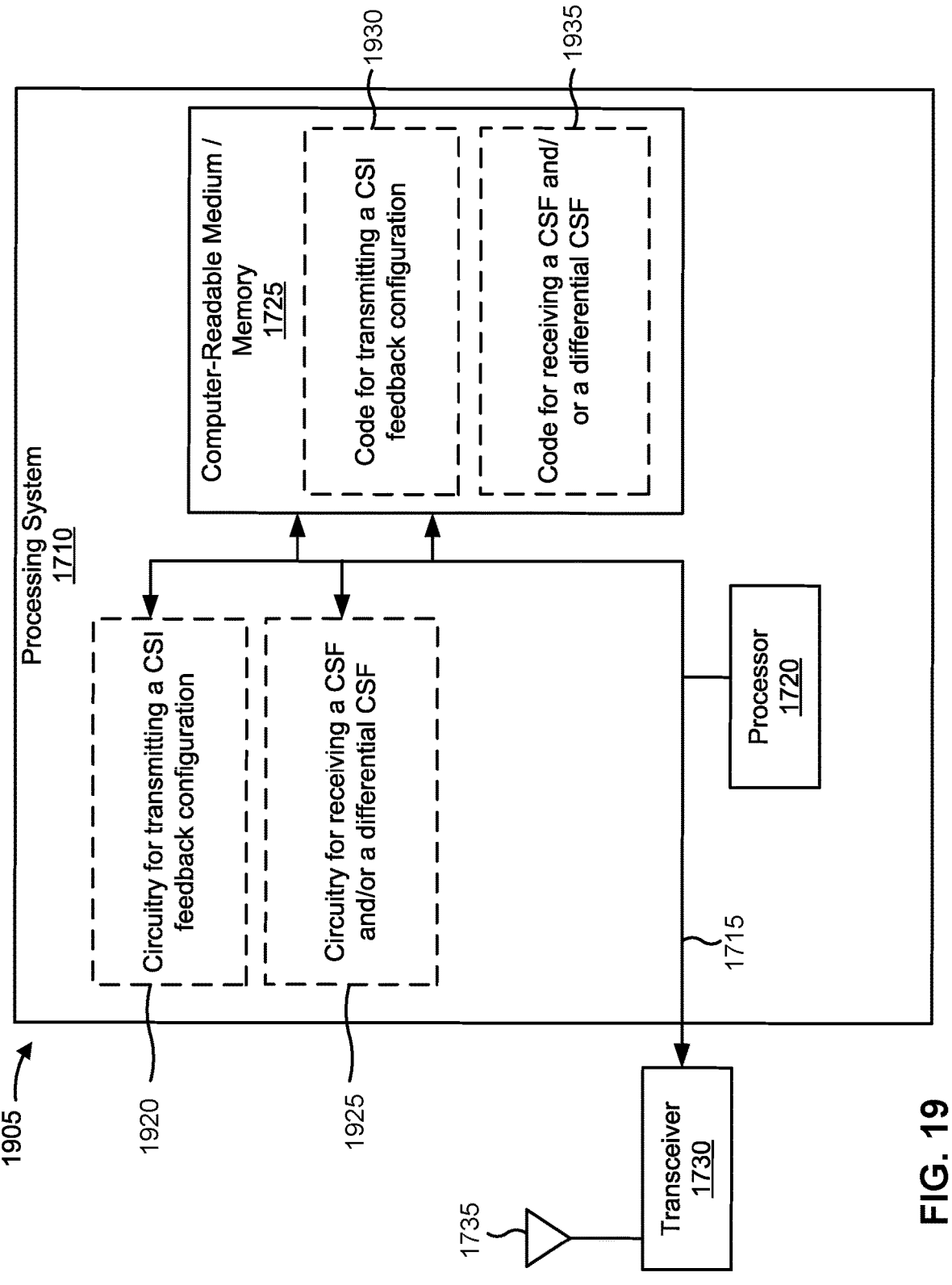

FIG. 19 is a diagram illustrating an example of an implementation of code and circuitry for an apparatus 1905. The apparatus 1905 may be a second device (e.g., a decoding device, a base station, and/or the like).

As further shown in FIG. 19, the apparatus 1905 may include circuitry for transmitting a CSI feedback configuration (circuitry 1920). For example, the apparatus 1905 may include circuitry to enable the apparatus 1905 to transmit a CSI feedback configuration comprising an indication to save a CSF that corresponds to a first reference signal carried on a downlink channel for a specified time period. In some aspects, the apparatus 1905 may include circuitry to enable the apparatus 1905 to transmit a CSI feedback configuration comprising an indication to refrain from transmitting a second CSF for a specified time period after transmitting a first CSF that includes neural network based CSI.

As further shown in FIG. 19, the apparatus 1905 may include circuitry for receiving a CSF and/or a differential CSF (circuitry 1925). For example, the apparatus 1905 may include circuitry to enable the apparatus 1905 to receive a CSF and/or a differential CSF based at least in part on the CSF and a second reference signal carried on the downlink channel.

As further shown in FIG. 19, the apparatus 1905 may include, stored in computer-readable medium 1725, code for transmitting a CSI feedback configuration (code 1930). For example, the apparatus 1905 may include code that, when executed by the processor 1720, may cause the transceiver 1730 to transmit a CSI feedback configuration comprising an indication to save a CSF that corresponds to a first reference signal carried on a downlink channel for a specified time period. In some aspects, the apparatus 1905 may include code that, when executed by the processor 1720, may cause the transceiver 1730 to transmit a CSI feedback configuration comprising an indication to refrain from transmitting a second CSF for a specified time period after transmitting a first CSF that includes neural network based CSI.

As further shown in FIG. 19, the apparatus 1905 may include, stored in computer-readable medium 1725, code for receiving a CSF and/or a differential CSF (code 1935). For example, the apparatus 1905 may include code that, when executed by the processor 1520, may cause the transceiver 1530 to receive a CSF and/or a differential CSF based at least in part on the CSF and a second reference signal carried on the downlink channel.

FIG. 19 is provided as an example. Other examples may differ from what is described in connection with FIG. 19.

Figure 20:
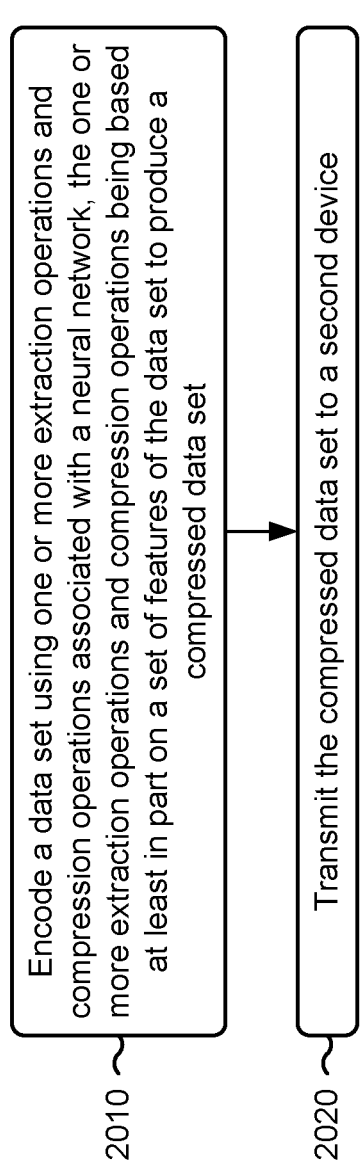

FIG. 20 is a diagram illustrating an example process 2000 performed, for example, by a first device, in accordance with the present disclosure. Example process 2000 is an example where the first device (e.g., an encoding device, UE 120, apparatus 1400 of FIG. 14, and/or the like) performs operations associated with encoding a data set using a neural network.

As shown in FIG. 20, in some aspects, process 2000 may include encoding a data set using one or more extraction operations and compression operations associated with a neural network, the one or more extraction operations and compression operations being based at least in part on a set of features of the data set to produce a compressed data set (block 2010). For example, the first device (e.g., using encoding component 1412 shown in FIG. 14) may encode a data set using one or more extraction operations and compression operations associated with a neural network, the one or more extraction operations and compression operations being based at least in part on a set of features of the data set to produce a compressed data set, as described above.

As further shown in FIG. 20, in some aspects, process 2000 may include transmitting the compressed data set to a second device (block 2020). For example, the first device (e.g., using transmission component 1406 shown in FIG. 14) may transmit the compressed data set to a second device, as described above.

Process 2000 may include additional aspects, such as any single aspect or any combination of aspects described below and/or in connection with one or more other processes described elsewhere herein.

In a first aspect, the data set is based at least in part on sampling of one or more reference signals.

In a second aspect, alone or in combination with the first aspect, transmitting the compressed data set to the second device includes transmitting channel state information feedback to the second device.

In a third aspect, alone or in combination with one or more of the first and second aspects, process 2000 includes identifying the set of features of the data set, wherein the one or more extraction operations and compression operations includes a first type of operation performed in a dimension associated with a feature of the set of features of the data set, and a second type of operation, that is different from the first type of operation, performed in remaining dimensions associated with other features of the set of features of the data set.

In a fourth aspect, alone or in combination with one or more of the first through third aspects, the first type of operation includes a one-dimensional fully connected layer operation, and the second type of operation includes a convolution operation.

In a fifth aspect, alone or in combination with one or more of the first through fourth aspects, the one or more extraction operations and compression operations include multiple operations that include one or more of a convolution operation, a fully connected layer operation, or a residual neural network operation.

In a sixth aspect, alone or in combination with one or more of the first through fifth aspects, the one or more extraction operations and compression operations include a first extraction operation and a first compression operation performed for a first feature of the set of features of the data set, and a second extraction operation and a second compression operation performed for a second feature of the set of features of the data set.

In a seventh aspect, alone or in combination with one or more of the first through sixth aspects, process 2000 includes performing one or more additional operations on an intermediate data set that is output after performing the one or more extraction operations and compression operations.

In an eighth aspect, alone or in combination with one or more of the first through seventh aspects, the one or more additional operations include one or more of a quantization operation, a flattening operation, or a fully connected operation.

In a ninth aspect, alone or in combination with one or more of the first through eighth aspects, the set of features of the data set includes one or more of a spatial feature, or a tap domain feature.

In a tenth aspect, alone or in combination with one or more of the first through ninth aspects, the one or more extraction operations and compression operations include one or more of a spatial feature extraction using a one-dimensional convolution operation, a temporal feature extraction using a one-dimensional convolution operation, a residual neural network operation for refining an extracted spatial feature, a residual neural network operation for refining an extracted temporal feature, a pointwise convolution operation for compressing the extracted spatial feature, a pointwise convolution operation for compressing the extracted temporal feature, a flattening operation for flattening the extracted spatial feature, a flattening operation for flattening the extracted temporal feature, or a compression operation for compressing one or more of the extracted temporal feature or the extracted spatial feature into a low dimension vector for transmission.

In an eleventh aspect, alone or in combination with one or more of the first through tenth aspects, the one or more extraction operations and compression operations include a first feature extraction operation associated with one or more features that are associated with a second device, a first compression operation for compressing the one or more features that are associated with the second device, a second feature extraction operation associated with one or more features that are associated with the first device, and a second compression operation for compressing the one or more features that are associated with the first device.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

FIG. 21 is a diagram illustrating an example process 2100 performed, for example, by a second device, in accordance with the present disclosure. Example process 2100 is an example where the second device (e.g., a decoding device, base station 110, apparatus 1600 of FIG. 16, and/or the like) performs operations associated with decoding a data set using a neural network.

As shown in FIG. 21, in some aspects, process 2100 may include receiving, from a first device, a compressed data set (block 2110). For example, the second device (e.g., using reception component 1602 shown in FIG. 16) may receive, from a first device, a compressed data set, as described above.

As further shown in FIG. 21, in some aspects, process 2100 may include decoding the compressed data set using one or more decompression operations and reconstruction operations associated with a neural network, the one or more decompression and reconstruction operations being based at least in part on a set of features of the compressed data set to produce a reconstructed data set (block 2120). For example, the second device (e.g., using communication manager 1604 shown in FIG. 16) may decode the compressed data set using one or more decompression operations and reconstruction operations associated with a neural network, the one or more decompression and reconstruction operations being based at least in part on a set of features of the compressed data set to produce a reconstructed data set, as described above.

Process 2100 may include additional aspects, such as any single aspect or any combination of aspects described below and/or in connection with one or more other processes described elsewhere herein.

In a first aspect, decoding the compressed data set using the one or more decompression operations and reconstruction operations includes performing the one or more decompression operations and reconstruction operations based at least in part on an assumption that the first device generated the compressed data set using a set of operations that are symmetric to the one or more decompression operations and reconstruction operations, or performing the one or more decompression operations and reconstruction operations based at least in part on an assumption that the first device generated the compressed data set using a set of operations that are asymmetric to the one or more decompression operations and reconstruction operations.

In a second aspect, alone or in combination with the first aspect, the compressed data set is based at least in part on sampling by the first device of one or more reference signals.

In a third aspect, alone or in combination with one or more of the first and second aspects, receiving the compressed data set includes receiving channel state information feedback from the first device.

In a fourth aspect, alone or in combination with one or more of the first through third aspects, the one or more decompression operations and reconstruction operations include a first type of operation performed in a dimension associated with a feature of the set of features of the compressed data set, and a second type of operation, that is different from the first type of operation, performed in remaining dimensions associated with other features of the set of features of the compressed data set.

In a fifth aspect, alone or in combination with one or more of the first through fourth aspects, the first type of operation includes a one-dimensional fully connected layer operation, and wherein the second type of operation includes a convolution operation.

In a sixth aspect, alone or in combination with one or more of the first through fifth aspects, the one or more decompression operations and reconstruction operations include multiple operations that include one or more of a convolution operation, a fully connected layer operation, or a residual neural network operation.

In a seventh aspect, alone or in combination with one or more of the first through sixth aspects, the one or more decompression operations and reconstruction operations include a first operation performed for a first feature of the set of features of the compressed data set, and a second operation performed for a second feature of the set of features of the compressed data set.

In an eighth aspect, alone or in combination with one or more of the first through seventh aspects, process 2100 includes performing a reshaping operation on the compressed data set.

In a ninth aspect, alone or in combination with one or more of the first through eighth aspects, the set of features of the compressed data set include one or more of a spatial feature, or a tap domain feature.

In a tenth aspect, alone or in combination with one or more of the first through ninth aspects, the one or more decompression operations and reconstruction operations include one or more of a feature decompression operation, a temporal feature reconstruction operation, or a spatial feature reconstruction operation.

In an eleventh aspect, alone or in combination with one or more of the first through tenth aspects, the one or more decompression operations and reconstruction operations include a first feature reconstruction operation performed for one or more features associated with the first device, and a second feature reconstruction operation performed for one or more features associated with the second device.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

The following provides an overview of some Aspects of the present disclosure:

Aspect 1: A method of wireless communication performed by a first device, comprising: receiving a channel state information (CSI) feedback configuration comprising an indication to save, for a specified time period, a channel state feedback (CSF) that corresponds to a first reference signal carried on a downlink channel; and transmitting a differential CSF based at least in part on the CSF and a second reference signal carried on the downlink channel.

Aspect 2: The method of Aspect 1, wherein the CSI feedback configuration is carried in at least one of: a radio resource control message, a medium access control (MAC) control element (MAC-CE), or a combination thereof.

Aspect 3: The method of either of Aspects 1 or 2, wherein the specified time period comprises a number of slots or a number of milliseconds.

Aspect 4: The method of any of Aspects 1-3, wherein the CSF comprises channel information and interference information.

Aspect 5: The method of any of Aspects 1-4, wherein the CSI feedback configuration indicates a differential encoding scheme to use for encoding, based at least in part on the CSF, the differential CSF.

Aspect 6: The method of any of Aspects 1-5, further comprising: receiving the first reference signal; determining CSI corresponding to the first reference signal; and encoding the CSI corresponding to the first reference signal using a first neural network to generate the CSF; and transmitting the CSF.

Aspect 7: The method of Aspect 6, further comprising: receiving the second reference signal; determining CSI corresponding to the second reference signal; determining a differential CSI based at least in part on the CSI corresponding to the first reference signal and the CSI corresponding to the second reference signal; and encoding the differential CSI using a second neural network to generate the differential CSF.

Aspect 8: The method of Aspect 7, wherein the CSI corresponding to the first reference signal has a first CSI type, and wherein the CSI corresponding to the second reference signal has a second CSI type.

Aspect 9: The method of Aspect 8, wherein the first CSI type comprises Type-I CSI, Type-II CSI, or Type-III CSI, and wherein the second CSI type comprises Type-I CSI, Type-II CSI, or differential neural network based CSI.

Aspect 10: The method of any of Aspects 1-9, wherein the CSI feedback configuration indicates a first neural network for encoding the CSF and a second neural network for encoding the differential CSF.

Aspect 11: The method of any of Aspects 1-10, wherein the CSI feedback configuration indicates a first power threshold for channel compression corresponding to the CSF and a second power threshold for channel compression corresponding to the differential CSF.

Aspect 12: The method of Aspect 11, wherein the CSI feedback configuration indicates a first number of delay taps to be used for channel compression corresponding to the CSF and a second number of delay taps to be used for channel compression corresponding to the differential CSF.

Aspect 13: The method of any of Aspects 1-12, wherein the CSI feedback configuration indicates a first compression amount corresponding to the CSF and a second compression amount corresponding to the differential CSF.

Aspect 14: The method of any of Aspects 1-13, wherein the CSI feedback configuration indicates a first quantization type corresponding to the CSF and a second quantization type corresponding to the differential CSF.

Aspect 15: The method of any of Aspects 1-14, wherein the CSI feedback configuration indicates a first neural network training time corresponding to the CSF and a second neural network training time corresponding to the differential CSF.

Aspect 16: The method of any of Aspects 1-15, wherein the differential CSF indicates a differential Type-III CSI.

Aspect 17: The method of any of Aspects 1-16, wherein the CSI feedback configuration comprises an indication to report at least one neural network based CSI based at least in part on determining that a differential neural network based reporting threshold is satisfied.

Aspect 18: The method of any of Aspects 1-17, wherein the first reference signal comprises a first CSI reference signal (CSI-RS) associated with a first set of antenna ports, and wherein the second reference signal comprises a second CSI-RS associated with a second set of antenna ports.

Aspect 19: The method of Aspect 18, wherein the specified time period comprises a time period during which the first set of antenna ports and the second set of antenna ports are quasi-co-located.

Aspect 20: The method of either of Aspects 18 or 19, wherein the CSI feedback configuration comprises an indication that the first set of antenna ports and the second set of antenna ports are not quasi-co-located.

Aspect 21: The method of Aspect 20, further comprising determining a number of bits for the differential CSF based at least in part on the indication that the first set of antenna ports and the second set of antenna ports are not quasi-co-located.

Aspect 22: The method of any of Aspects 18-21, further comprising receiving an indication of a number of bits for the differential CSF, wherein the number of bits for the differential CSF is based at least in part on a determination that the first set of antenna ports and the second set of antenna ports are not quasi co-located.

Aspect 23: The method of Aspect 22, wherein the indication of the number of bits is carried in at least one of: downlink control information (DCI), a medium access control (MAC) control element (MAC-CE), or a combination of DCI and a MAC-CE.

Aspect 24: A method of wireless communication performed by a first device, comprising: receiving a channel state information (CSI) feedback configuration comprising an indication to refrain from transmitting a second channel state feedback (CSF) for a specified time period after transmitting a first CSF that includes neural network based CSI; transmitting the first CSF; and refraining from transmitting the second CSF based at least in part on the CSI feedback configuration.

Aspect 25: The method of Aspect 24, wherein the second CSF comprises Type-I CSI or Type-II CSI.

Aspect 26: A method of wireless communication performed by a second device, comprising: transmitting a channel state information (CSI) feedback configuration comprising an indication to save a channel state feedback (CSF) that corresponds to a first reference signal carried on a downlink channel for a specified time period; and receiving a differential CSF based at least in part on the CSF and a second reference signal carried on the downlink channel.

Aspect 27: The method of Aspect 26, wherein the CSI feedback configuration is carried in at least one of: a radio resource control message, a medium access control (MAC) control element (MAC-CE), or a combination thereof.

Aspect 28: The method of either of Aspects 26 or 27, wherein the specified time period comprises a number of slots or a number of milliseconds.

Aspect 29: The method of any of Aspects 26-28, wherein the CSF comprises channel information and interference information.

Aspect 30: The method of any of Aspects 26-29, wherein the CSI feedback configuration indicates a differential encoding scheme to be used for encoding, based at least in part on the CSF, the differential CSF.

Aspect 31: The method of any of Aspects 26-30, further comprising: transmitting the first reference signal; and receiving the CSF.

Aspect 32: The method of any of Aspects 26-31, further comprising transmitting the second reference signal.

Aspect 33: The method of any of Aspects 26-32, wherein the CSI feedback configuration includes: an indication of a first neural network; an indication to determine CSI corresponding to the first reference signal; and an indication to encode the CSI corresponding to the first reference signal using a first neural network to generate the CSF.

Aspect 34: The method of Aspect 33, wherein the CSI feedback configuration includes: an indication of a second neural network; an indication to determine CSI corresponding to the second reference signal; an indication to determine a differential CSI based at least in part on the CSI corresponding to the first reference signal and the CSI corresponding to the second reference signal; and an indication to encode the differential CSI using a second neural network to generate the differential CSF.

Aspect 35: The method of Aspect 34, wherein the CSI corresponding to the first reference signal has a first CSI type, and wherein the CSI corresponding to the second reference signal has a second CSI type.

Aspect 36: The method of Aspect 35, wherein the first CSI type comprises Type-I CSI, Type-II CSI, or Type-III CSI, and wherein the second CSI type comprises Type-I CSI, Type-II CSI, or differential neural network based CSI.

Aspect 37: The method of any of Aspects 26-36, wherein the CSI feedback configuration indicates a first power threshold for channel compression corresponding to the CSF and a second power threshold for channel compression corresponding to the differential CSF.

Aspect 38: The method of Aspect 37, wherein the CSI feedback configuration indicates a first number of delay taps to be used for channel compression corresponding to the CSF and a second number of delay taps to be used for channel compression corresponding to the differential CSF.

Aspect 39: The method of any of Aspects 26-38, wherein the CSI feedback configuration indicates a first compression amount corresponding to the CSF and a second compression amount corresponding to the differential CSF.

Aspect 40: The method of any of Aspects 26-39, wherein the CSI feedback configuration indicates a first quantization type corresponding to the CSF and a second quantization type corresponding to the differential CSF.

Aspect 41: The method of any of Aspects 26-40, wherein the CSI feedback configuration indicates a first neural network training time corresponding to the CSF and a second neural network training time corresponding to the differential CSF.

Aspect 42: The method of any of Aspects 26-41, wherein the differential CSF indicates a differential Type-III CSI.

Aspect 43: The method of any of Aspects 26-42, wherein the CSI feedback configuration comprises an indication to report at least one neural network based CSI based at least in part on determining that a differential neural network based reporting threshold is satisfied.

Aspect 44: The method of any of Aspects 26-43, wherein the first reference signal comprises a first CSI reference signal (CSI-RS) associated with a first set of antenna ports, and wherein the second reference signal comprises a second CSI-RS associated with a second set of antenna ports.

Aspect 45: The method of Aspect 44, wherein the specified time period comprises a time period during which the first set of antenna ports and the second set of antenna ports are quasi-co-located.

Aspect 46: The method of either of Aspects 44 or 45, wherein the CSI feedback configuration comprises an indication that the first set of antenna ports and the second set of antenna ports are not quasi-co-located.

Aspect 47: The method of any of Aspects 44-46, further comprising: determining that the first set of antenna ports and the second set of antenna ports are not quasi co-located; determining a number of bits for the differential CSF based at least in part on determining that the first set of antenna ports and the second set of antenna ports are not quasi co-located; and transmitting an indication of the number of bits for the differential CSF.

Aspect 48: The method of Aspect 47, wherein the indication of the number of bits is carried in at least one of: downlink control information (DCI), a medium access control (MAC) control element (MAC-CE), or a combination of DCI and a MAC-CE.

Aspect 49: A method of wireless communication performed by a second device, comprising: transmitting a channel state information (CSI) feedback configuration comprising an indication to refrain from transmitting a second channel state feedback (CSF) for a specified time period after transmitting a first CSF that includes neural network based CSI; and receiving the first CSF.

Aspect 50: The method of Aspect 49, wherein the second CSF comprises Type-I CSI or Type-II CSI.

Aspect 51: An apparatus for wireless communication at a device, comprising a processor; memory coupled with the processor; and instructions stored in the memory and executable by the processor to cause the apparatus to perform the method of one or more of Aspects 1-23.

Aspect 52: A device for wireless communication, comprising a memory and one or more processors coupled to the memory, the one or more processors configured to perform the method of one or more of Aspects 1-23.

Aspect 53: An apparatus for wireless communication, comprising at least one means for performing the method of one or more of Aspects 1-23.

Aspect 54: A non-transitory computer-readable medium storing code for wireless communication, the code comprising instructions executable by a processor to perform the method of one or more of Aspects 1-23.

Aspect 55: A non-transitory computer-readable medium storing a set of instructions for wireless communication, the set of instructions comprising one or more instructions that, when executed by one or more processors of a device, cause the device to perform the method of one or more of Aspects 1-23.

Aspect 56: An apparatus for wireless communication at a device, comprising a processor; memory coupled with the processor; and instructions stored in the memory and executable by the processor to cause the apparatus to perform the method of one or more of Aspects 24-25.

Aspect 57: A device for wireless communication, comprising a memory and one or more processors coupled to the memory, the one or more processors configured to perform the method of one or more of Aspects 24-25.

Aspect 58: An apparatus for wireless communication, comprising at least one means for performing the method of one or more of Aspects 24-25.

Aspect 59: A non-transitory computer-readable medium storing code for wireless communication, the code comprising instructions executable by a processor to perform the method of one or more of Aspects 24-25.

Aspect 60: A non-transitory computer-readable medium storing a set of instructions for wireless communication, the set of instructions comprising one or more instructions that, when executed by one or more processors of a device, cause the device to perform the method of one or more of Aspects 24-25.

Aspect 61: An apparatus for wireless communication at a device, comprising a processor; memory coupled with the processor; and instructions stored in the memory and executable by the processor to cause the apparatus to perform the method of one or more of Aspects 26-48.

Aspect 62: A device for wireless communication, comprising a memory and one or more processors coupled to the memory, the one or more processors configured to perform the method of one or more of Aspects 26-48.

Aspect 63: An apparatus for wireless communication, comprising at least one means for performing the method of one or more of Aspects 26-48.

Aspect 64: A non-transitory computer-readable medium storing code for wireless communication, the code comprising instructions executable by a processor to perform the method of one or more of Aspects 26-48.

Aspect 65: A non-transitory computer-readable medium storing a set of instructions for wireless communication, the set of instructions comprising one or more instructions that, when executed by one or more processors of a device, cause the device to perform the method of one or more of Aspects 26-48.

Aspect 66: An apparatus for wireless communication at a device, comprising a processor; memory coupled with the processor; and instructions stored in the memory and executable by the processor to cause the apparatus to perform the method of one or more of Aspects 49-50.

Aspect 67: A device for wireless communication, comprising a memory and one or more processors coupled to the memory, the one or more processors configured to perform the method of one or more of Aspects 49-50.

Aspect 68: An apparatus for wireless communication, comprising at least one means for performing the method of one or more of Aspects 49-50.

Aspect 69: A non-transitory computer-readable medium storing code for wireless communication, the code comprising instructions executable by a processor to perform the method of one or more of Aspects 49-50.

Aspect 70: A non-transitory computer-readable medium storing a set of instructions for wireless communication, the set of instructions comprising one or more instructions that, when executed by one or more processors of a device, cause the device to perform the method of one or more of Aspects 49-50.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a device, comprising:

receiving a channel state information (CSI) feedback configuration comprising an indication to save, for a specified time period, channel state feedback (CSF) that corresponds to a first reference signal carried on a downlink channel;

transmitting a differential CSF based at least in part on the CSF and a second reference signal carried on the downlink channel, wherein the method further comprises: receiving an indication of a number of bits for the differential CSF, wherein the number of bits for the differential CSF is based at least in part on a determination that a first set of antenna ports associated with a first CSI reference signal (CSI-RS) and a second set of antenna ports associated with a second CSI-RS are not quasi co-located.

2. The method of claim 1, wherein the specified time period comprises a number of slots or a number of milliseconds.

3. The method of claim 1, wherein the CSI feedback configuration indicates a differential encoding scheme to use for encoding, based at least in part on the CSF, the differential CSF.

4. The method of claim 1, further comprising:

receiving the second reference signal;

determining another CSI corresponding to the second reference signal;

determining a differential CSI based at least in part on the CSI corresponding to the first reference signal and the other CSI corresponding to the second reference signal; and encoding the differential CSI using a second neural network to generate the differential CSF.

5. The method of claim 4, wherein the CSI corresponding to the first reference signal has a first CSI type, and wherein the other CSI corresponding to the second reference signal has a second CSI type.

6. The method of claim 1, wherein the CSI feedback configuration indicates a first neural network for encoding the CSF and a second neural network for encoding the differential CSF.

7. The method of claim 1, wherein the CSI feedback configuration indicates a first power threshold for channel compression corresponding to the CSF and a second power threshold for channel compression corresponding to the differential CSF.

8. The method of claim 1, wherein the CSI feedback configuration indicates a first compression amount corresponding to the CSF and a second compression amount corresponding to the differential CSF.

9. The method of claim 1, wherein the CSI feedback configuration indicates a first quantization type corresponding to the CSF and a second quantization type corresponding to the differential CSF.

10. The method of claim 1, wherein the CSI feedback configuration indicates a first neural network training time corresponding to the CSF and a second neural network training time corresponding to the differential CSF.

11. The method of claim 1, wherein the differential CSF indicates a differential Type-III CSI.

12. The method of claim 1, wherein the CSI feedback configuration comprises an indication to report at least one neural network based CSI based at least in part on determining that a differential neural network based reporting threshold is satisfied.

13. The method of claim 1, wherein the first reference signal comprises the first CSI-RS associated with the first set of antenna ports, and wherein the second reference signal comprises the second CSI-RS associated with the second set of antenna ports.

14. The method of claim 1, wherein the method comprises:

determining CSI corresponding to the first reference signal, wherein the CSI is a function of a channel response of the downlink channel and interference information; and generating the CSF, at least in part, by separately encoding the channel response of the downlink channel and the interference information, using a first neural network.

15. A method of wireless communication performed by a device, comprising:

receiving a channel state information (CSI) feedback configuration comprising an indication to save, for a specified time period, channel state feedback (CSF) that corresponds to a first reference signal carried on a downlink channel; and transmitting a differential CSF based at least in part on the CSF and a second reference signal carried on the downlink channel, wherein the CSI feedback configuration indicates a first number of delay taps to be used for channel compression corresponding to the CSF and a second number of delay taps to be used for channel compression corresponding to the differential CSF.

16. A device for wireless communication, comprising: one or more memories; and one or more processors, coupled to the one or more memories, configured to cause the device to:

receive a channel state information (CSI) feedback configuration comprising an indication to save, for a specified time period, a channel state feedback (CSF) that corresponds to a first reference signal carried on a downlink channel;

transmit a differential CSF based at least in part on the CSF and a second reference signal carried on the downlink channel, wherein the one or more processors are further configured to cause the device to: receive an indication of a number of bits for the differential CSF, wherein the number of bits for the differential CSF is based at least in part on a determination that a first set of antenna ports associated with a first CSI reference signal (CSI-RS) and a second set of antenna ports associated with a second CSI-RS are not quasi co-located.

17. The device of claim 16, wherein the one or more processors are configured to cause the device to:

determine CSI corresponding to the first reference signal, wherein the CSI is a function of a channel response of the downlink channel and interference information; and generate the CSF, at least in part, by separately encoding the channel response of the downlink channel and the interference information, using a first neural network.

18. The device of claim 16, wherein the specified time period comprises a number of slots or a number of milliseconds.

19. The device of claim 16, wherein the CSI feedback configuration indicates a differential encoding scheme to use for encoding, based at least in part on the CSF, the differential CSF.

20. The device of claim 16, wherein the one or more processors are configured to cause the device to:

receive the second reference signal;

determine another CSI corresponding to the second reference signal;

determine a differential CSI based at least in part on the CSI corresponding to the first reference signal and the other CSI corresponding to the second reference signal; and encode the differential CSI using a second neural network to generate the differential CSF.

21. The device of claim 20, wherein the CSI corresponding to the first reference signal has a first CSI type, and wherein the other CSI corresponding to the second reference signal has a second CSI type.

22. The device of claim 16, wherein the CSI feedback configuration indicates a first neural network for encoding the CSF and a second neural network for encoding the differential CSF.

23. The device of claim 16, wherein the CSI feedback configuration indicates a first power threshold for channel compression corresponding to the CSF and a second power threshold for channel compression corresponding to the differential CSF.

24. The device of claim 16, wherein the CSI feedback configuration indicates a first compression amount corresponding to the CSF and a second compression amount corresponding to the differential CSF.

25. The device of claim 16, wherein the CSI feedback configuration indicates a first quantization type corresponding to the CSF and a second quantization type corresponding to the differential CSF.

26. The device of claim 16, wherein the CSI feedback configuration indicates a first neural network training time corresponding to the CSF and a second neural network training time corresponding to the differential CSF.

27. The device of claim 16, wherein the differential CSF indicates a differential Type-III CSI.

28. The device of claim 16, wherein the CSI feedback configuration comprises an indication to report at least one neural network based CSI based at least in part on determining that a differential neural network based reporting threshold is satisfied.

29. The device of claim 16, wherein the first reference signal comprises the first CSI-RS associated with the first set of antenna ports, and wherein the second reference signal comprises the second CSI-RS associated with the second set of antenna ports.

30. A device for wireless communication, comprising: one or more memories; and one or more processors, coupled to the one or more memories, configured to cause the device to:

receive a channel state information (CSI) feedback configuration comprising an indication to save, for a specified time period, channel state feedback (CSF) that corresponds to a first reference signal carried on a downlink channel; and transmit a differential CSF based at least in part on the CSF and a second reference signal carried on the downlink channel, wherein the CSI feedback configuration indicates a first number of delay taps to be used for channel compression corresponding to the CSF and a second number of delay taps to be used for channel compression corresponding to the differential CSF.

* * * * *